US012759287B2

(12) United States Patent
Okano

(10) Patent No.: US 12,759,287 B2

(45) Date of Patent: Oct. 13, 2026

(54) NOZZLE STATE INSPECTION APPARATUS, NOZZLE STATE INSPECTION METHOD, AND NON-TRANSITORY RECORDING MEDIUM STORING COMPUTER-READABLE NOZZLE STATE INSPECTION PROGRAM

(71) Applicant: Konica Minolta, Inc., Tokyo (JP)

(72) Inventor: Hiroaki Okano, Kodaira (JP)

(73) Assignee: KONICA MINOLTA, INC., Tokyo (JP)

( * ) Notice: Subject to any disclaimer, the term of this patent is extended or adjusted under 35 U.S.C. 154(b) by 70 days.

(21) Appl. No.: 18/680,316

(22) Filed: May 31, 2024

(65) Prior Publication Data

US 2024/0416648 A1 Dec. 19, 2024

(30) Foreign Application Priority Data

Jun. 16, 2023 (JP) ................................ 2023-099598

(51) Int. Cl.
*B41J 2/045* (2006.01)

(52) U.S. Cl.
CPC ......... *B41J 2/0451* (2013.01); *B41J 2/04581* (2013.01); *B41J 2/04588* (2013.01)

(58) Field of Classification Search
CPC ... B41J 2/0451; B41J 2/04581; B41J 2/04588
See application file for complete search history.

(56) References Cited

U.S. PATENT DOCUMENTS

2013/0083107 A1* 4/2013 Nishikawa ............ B41J 2/0451 347/10

FOREIGN PATENT DOCUMENTS

JP 2016020088 A 2/2016

* cited by examiner

*Primary Examiner* — Lisa Solomon

(74) *Attorney, Agent, or Firm* — CANTOR COLBURN LLP

(57) ABSTRACT

A nozzle state inspection apparatus has an inexpensive configuration and inspects a state of a nozzle by acquiring a reverberation waveform of the nozzle with high accuracy. The nozzle state inspection apparatus includes a hardware processor, in which the hardware processor is capable of forming a drive waveform including first drive output and second drive output and outputting the drive waveform to a plurality of nozzles included in an inkjet head, and the hardware processor acquires, in accordance with the drive waveform, a reverberation waveform generated in a nozzle to be measured among the plurality of nozzles and inspects the nozzle for abnormality.

11 Claims, 20 Drawing Sheets

FIG. 4

| LINE | MEASUREMENT TARGET NOZZLE | | NOZZLES OTHER THAN MEASUREMENT TARGET NOZZLE | |
|---|---|---|---|---|
| | IMAGE DATA | SWITCHING OPERATION | IMAGE DATA | SWITCHING OPERATION |
| 1 | D1 | ON | D0 | OFF |
| 2 | D1 | ON | D0 | OFF |
| 3 | D1 | ON | D0 | OFF |
| 4 | D1 | ON | D0 | OFF |
| 5 | D1 | ON | D0 | OFF |
| 6 | D1 | ON | D0 | OFF |
| 7 | D1 | ON | D0 | OFF |
| 8 | D1 | ON | D0 | OFF |
| 9 | D1 | ON | D0 | OFF |
| 10 | D1 | ON | D0 | OFF |
| 11 | D0 | OFF | D0 | OFF |
| 12 | D0 | OFF | D0 | OFF |
| ... | ... | ... | ... | ... |

FIG. 8

| LINE | MEASUREMENT TARGET NOZZLE | | NOZZLES OTHER THAN MEASUREMENT TARGET NOZZLE | |
|---|---|---|---|---|
| | IMAGE DATA | SWITCHING OPERATION | IMAGE DATA | SWITCHING OPERATION |
| 1 | D1 | ON | D0 | OFF |
| 2 | D1 | ON | D0 | OFF |
| 3 | D1 | ON | D0 | OFF |
| 4 | D1 | ON | D0 | OFF |
| 5 | D1 | ON | D0 | OFF |
| 6 | D1 | ON | D0 | OFF |
| 7 | D1 | ON | D0 | OFF |
| 8 | D1 | ON | D0 | OFF |
| 9 | D1 | ON | D0 | OFF |
| 10 | D1 | ON | D0 | OFF |
| 11 | D0 | OFF | D1 | ON |
| 12 | D0 | OFF | D1 | ON |
| ... | ... | ... | ... | ... |

FIG. 14

| LINE | MEASUREMENT TARGET NOZZLE | | NOZZLES OTHER THAN MEASUREMENT TARGET NOZZLE | |
|---|---|---|---|---|
| | IMAGE DATA | SWITCHING OPERATION | IMAGE DATA | SWITCHING OPERATION |
| 1 | D1 | ON→OFF | D0 | OFF→OFF |
| 2 | D1 | ON→OFF | D0 | OFF→OFF |
| 3 | D1 | ON→OFF | D0 | OFF→OFF |
| 4 | D1 | ON→OFF | D0 | OFF→OFF |
| 5 | D1 | ON→OFF | D0 | OFF→OFF |
| 6 | D1 | ON→OFF | D0 | OFF→OFF |
| 7 | D1 | ON→OFF | D0 | OFF→OFF |
| 8 | D1 | ON→OFF | D0 | OFF→OFF |
| 9 | D1 | ON→OFF | D0 | OFF→OFF |
| 10 | D1 | ON→OFF | D0 | OFF→ON |
| 11 | D1 | ON→OFF | D2 | OFF→ON |
| 12 | D0 | OFF→OFF | D2 | OFF→ON |
| ... | ... | ... | ... | ... |

NOZZLE STATE INSPECTION APPARATUS, NOZZLE STATE INSPECTION METHOD, AND NON-TRANSITORY RECORDING MEDIUM STORING COMPUTER-READABLE NOZZLE STATE INSPECTION PROGRAM

CROSS-REFERENCE TO RELATED APPLICATION

The present invention claims priority under 35 U.S.C. § 119 to Japanese patent Application No. 2023-099598, filed on Jun. 16, 2023, the entire content of which is incorporated herein by reference.

BACKGROUND OF THE INVENTION

1. Technical Field

The present invention relates to a nozzle state inspection apparatus, a nozzle state inspection method, and a non-transitory recording medium storing a computer-readable nozzle state inspection program.

2. Description of Related Art

Conventionally, in an inkjet recording apparatus, a nozzle of an inkjet head includes a piezoelectric element, and the piezoelectric element applies pressure to the nozzle to eject ink from the nozzle. Residual vibration occurs immediately after the piezoelectric element is driven, and a reverberation waveform caused by the residual vibration can be observed. Since the reverberation waveform indicates a characteristic change corresponding to the state of the nozzle, a technique has been proposed in which a state indicating whether or not ink is normally ejected from the nozzle is inspected by observing the reverberation waveform. Such a technique is disclosed in, for example, Japanese Unexamined Patent Application Publication No. 2016-20088.

The technique disclosed in Japanese Unexamined Patent Application Publication No. 2016-20088 sequentially switches nozzles of an inkjet head, detects residual vibration based on expansion and contraction of piezoelectric elements of the nozzles with a residual vibration detector, calculates a damping ratio of the residual vibration based on output of the residual vibration detector, and determines whether or not the ejection of each of the nozzles is normal.

Incidentally, the inkjet head includes hundreds to thousands of nozzles. In a case where the inkjet head includes a multi-channel switch for implementing switching between its hundreds to thousands of nozzles, the cost further increases. In this case, it is possible to reduce the cost by using a two-channel switch for each nozzle to switch whether or not a drive waveform for driving the nozzle is applied.

SUMMARY OF THE INVENTION

As described above, conventionally, a technique has been proposed in which an abnormality of a nozzle is detected by observing a reverberation waveform immediately after the nozzle of an inkjet head is driven. However, the technique disclosed in Japanese Unexamined Patent Application Publication No. 2016-20088 includes the multi-channel switch that implements switching between the large number of nozzles, and thus has a problem of high cost. On the other hand, the cost can be reduced by using a two-channel switch by each nozzle as switching means. However, in such a configuration, since nozzles other than a measurement target nozzle for which a reverberation waveform is to be measured are not driven, the two-channel switches connected to the nozzles other than the measurement target nozzle are set to OFF and are connected in parallel. A large capacity is formed by connecting in parallel the nozzles that are electrically equivalent to a capacitor. Due to this large capacity, the reverberation waveform in the measurement target nozzle is attenuated, and there is a problem in that the accuracy of inspecting the reverberation waveform decreases.

The present invention has been devised in order to solve the above-described problems. An object of the present invention is to inspect a nozzle state by acquiring a reverberation waveform of a nozzle with high accuracy with an inexpensive configuration.

According to the present invention, a nozzle state inspection apparatus includes a hardware processor, in which the hardware processor is capable of forming a drive waveform including first drive output and second drive output and outputting the drive waveform to a plurality of nozzles included in an inkjet head, and the hardware processor acquires, in accordance with the drive waveform, a reverberation waveform generated in a nozzle to be measured among the plurality of nozzles and inspects the nozzle for abnormality.

BRIEF DESCRIPTION OF THE DRAWINGS

The advantages and features provided by one or more embodiments of the invention will become more fully understand from the detailed description given hereinbelow and the appended drawings which are given by way of illustration only, and thus are not intended as a definition of the limits of the present invention.

FIG. 4 is a diagram for explaining switching operations in a first operation example of the nozzle state inspection apparatus using the two-channel switches.

FIG. 8 is a diagram for explaining switching operations in a second operation example of the nozzle state inspection apparatus using the two-channel switches.

FIG. 14 is a diagram for explaining switching operations in the nozzle state inspection apparatus according to the first embodiment of the present invention.

DETAILED DESCRIPTION

Figure 1:
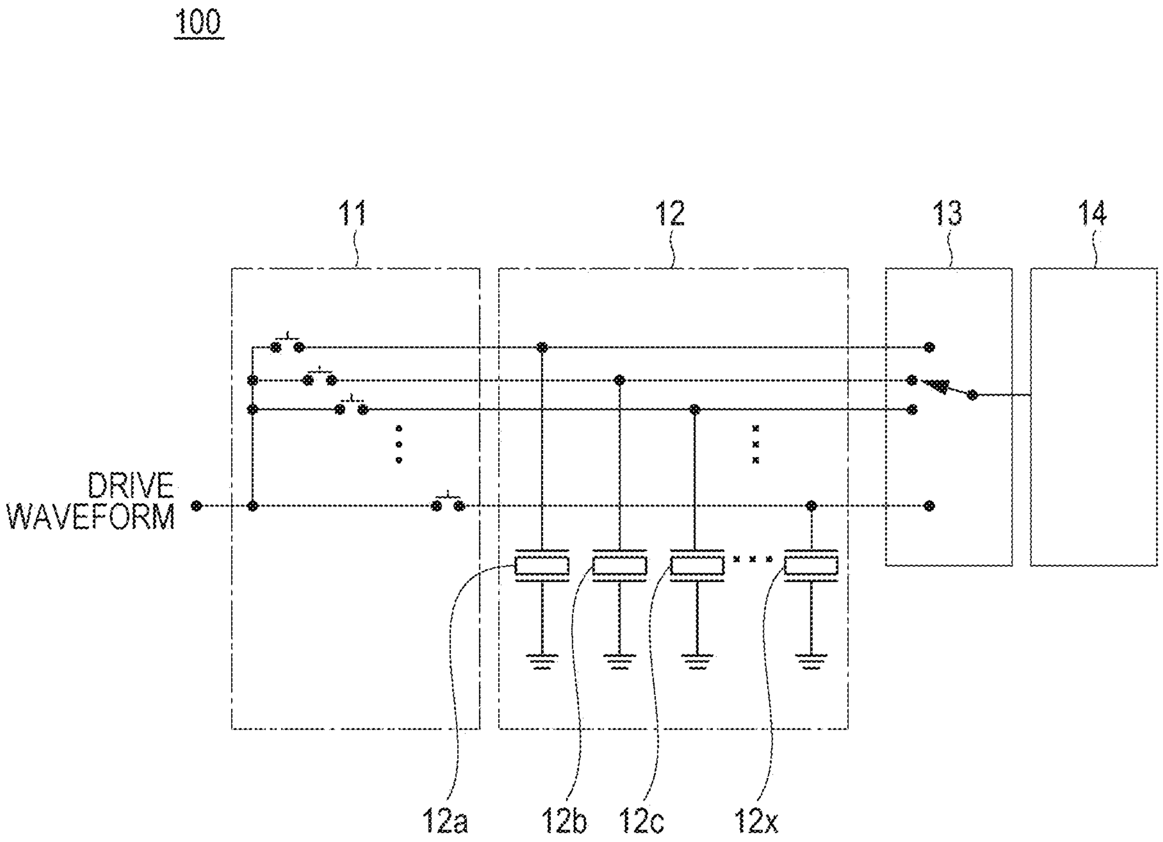
FIG. 1 is a diagram illustrating an example of a configuration of a nozzle state inspection apparatus using a multi-channel switch.

Hereinafter, one or more embodiments of the present invention will be described with reference to the drawings. However, the scope of the invention is not limited to the disclosed embodiments.

In the present specification and drawings, constituent elements having substantially the same functions or configurations are denoted by the same reference numerals, and redundant description will be omitted.

Before describing embodiments of the present invention, problems will be described, which exist in each of a nozzle state inspection apparatus using a multi-channel switch and a nozzle state inspection apparatus using two-channel switches.

FIG. 1 is a diagram illustrating an example of a configuration of a nozzle state inspection apparatus 100 using a multi-channel switch. As illustrated in FIG. 1, the nozzle state inspection apparatus 100 includes a piezoelectric element drive circuit 11, piezoelectric elements 12 included in respective nozzles, a multi-channel switch 13, and a waveform processing circuit 14.

The piezoelectric elements 12 included in the respective nozzles include, for example, piezoelectric elements 12*a* to 12*x*.

The piezoelectric element drive circuit 11 receives a drive waveform and drives the piezoelectric elements (the piezoelectric elements 12*a* to 12*x*) based on the drive waveform. The piezoelectric element drive circuit 11 includes a plurality of switching elements. Turning on and off of the piezoelectric element drive circuit 11 is controlled by turning on and off the switching elements formed corresponding to the piezoelectric elements. After the ejection of an ink droplet, that is, after the piezoelectric element drive circuit 11 is switched from ON to OFF, the piezoelectric elements 12 are connected to the waveform processing circuit 14 via the multi-channel switch 13. The waveform processing circuit 14 performs processing such as noise removal and amplification on reverberation waveforms of the piezoelectric elements 12 and outputs the reverberation waveforms. The states of the nozzles can be inspected by observing the reverberation waveforms output from the waveform processing circuit 14.

However, in the nozzle state inspection apparatus 100 illustrated in FIG. 1, the multi-channel switch 13 is a switch having hundreds to thousands of channels for switching piezoelectric elements of hundreds to thousands of nozzles. Providing the multi-channel switch 13 leads to a problem of increase in cost.

Figure 2:
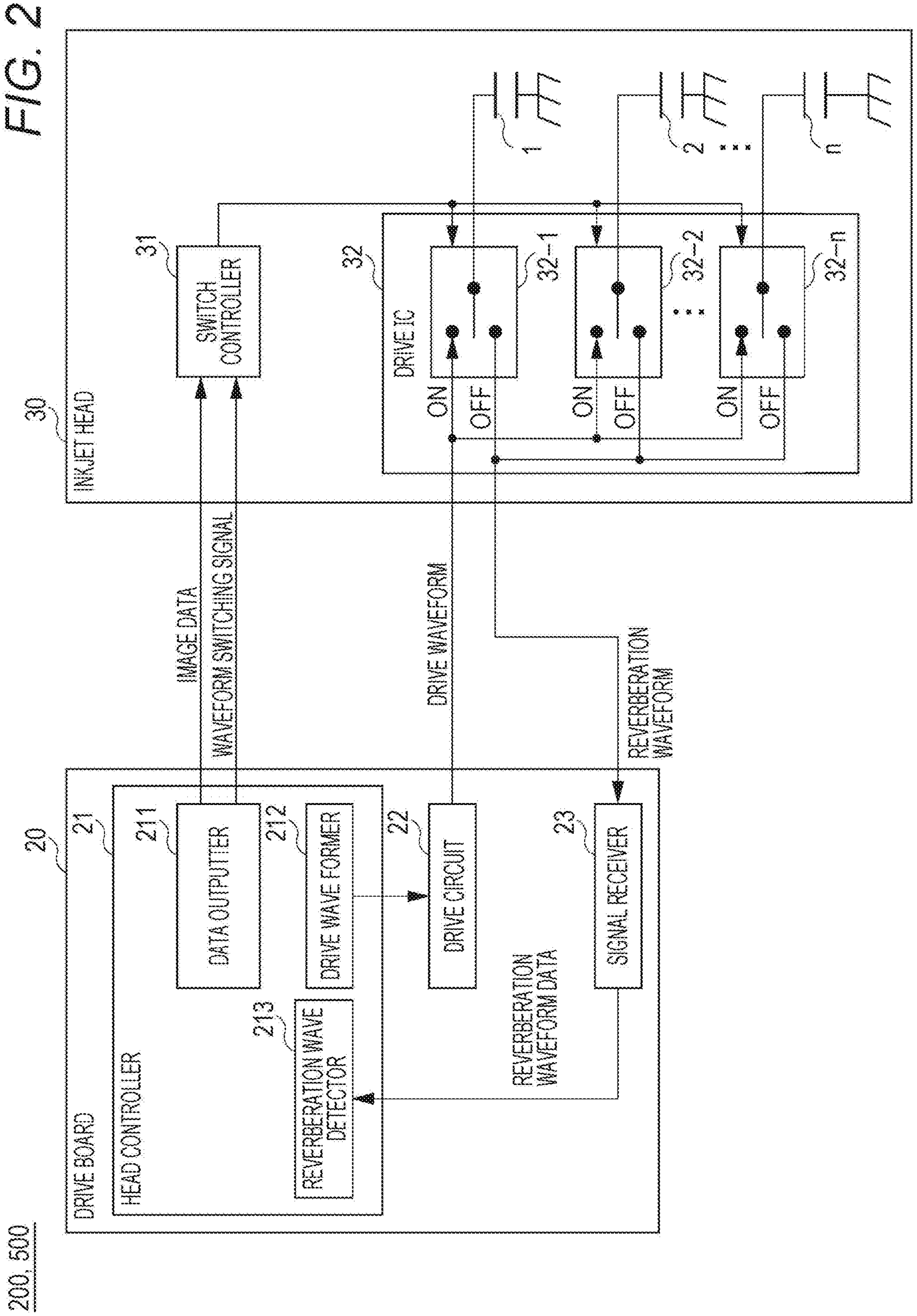
FIG. 2 is a diagram illustrating an example of a configuration of a nozzle state inspection apparatus using two-channel switches.

FIG. 2 is a diagram illustrating an example of a configuration of a nozzle state inspection apparatus 200 using two-channel switches. As illustrated in FIG. 2, the nozzle state inspection apparatus 200 includes a drive board 20 and an inkjet head 30. Note that the nozzle state inspection apparatus 200 has the same configuration as a nozzle state inspection apparatus 500 according to a first embodiment of the present invention to be described later.

The drive board 20 includes a field programmable gate array (FPGA) or the like and drives the inkjet head 30 to perform various kinds of control related to an ink ejection operation of the inkjet head 30. The drive board 20 includes a head controller 21, a drive circuit 22, and a signal receiver 23. The head controller 21 is connected to each of the drive circuit 22 and the signal receiver 23. In addition, the head controller 21 is connected to a switch controller 31 (described later) of the inkjet head 30. The drive circuit 22 and the signal receiver 23 are each connected to a drive integrated circuit (IC) 32 (described later) of the inkjet head 30.

The head controller 21 generates and outputs a drive signal for driving the piezoelectric elements (not illustrated) in order to cause liquid (e.g., ink) to be appropriately ejected from each of the nozzles of the inkjet head 30. As illustrated in FIG. 2, the head controller 21 includes a data outputter 211, a drive wave former 212, and a reverberation wave detector 213 common to the plurality of nozzles. In the following description, the "drive signal" is also referred to as a "drive waveform".

The data outputter 211 selects image data registered in advance, and outputs the selected image data to the switch controller 31 (described later) of the inkjet head 30. In addition, the data outputter 211 outputs, to the switch controller 31 (described later) of the inkjet head 30, a waveform switching signal indicating the timing of outputting the drive waveform.

The drive wave former 212 selects a pattern of the drive waveform registered in advance, forms the drive waveform, and outputs the drive waveform to the drive circuit 22.

The reverberation wave detector 213 is common to the plurality of nozzles, acquires a reverberation waveform output by the signal receiver 23, and analyzes the reverberation waveform with respect to abnormality inspection of the nozzles. Note that the result of analyzing the reverberation waveform by the reverberation wave detector 213 is output to an external display device, a signal waveform measurement device, or the like (not illustrated).

The drive waveform formed by the drive wave former 212 is input to the drive circuit 22. The drive circuit 22 applies the input drive waveform to each of the nozzles via the drive IC 32 (described later) of the inkjet head 30 to drive each of the nozzles.

The signal receiver 23 acquires reverberation waveforms generated in the nozzles of the inkjet head 30, and outputs the reverberation waveforms to the reverberation wave detector 213 of the head controller 21.

As illustrated in FIG. 2, the inkjet head 30 includes the switch controller 31, the drive IC 32, and the plurality of nozzles (nozzles 1 to n) that eject liquid. The drive IC 32 includes the same number of two-channel switches (switches 32-1 to **32-*n*) as the number of nozzles. The output sides of the switches (the switch 32-1 to the switch 32-*n*) are connected to the respective nozzles. An ON-side input terminal of each of the switches is connected to the output side of the drive circuit 22 of the drive board 20. An OFF-side input terminal of each of the switches is connected to the input side of the signal receiver 23 of the drive board 20. When each of the switches is set to ON, a nozzle connected to the switch is driven by the drive waveform. When each of the switches is set to OFF, a reverberation waveform generated in a nozzle connected to the switch is acquired by the signal receiver 23**.

The switch controller 31 receives the image data and the waveform switching signal from the data outputter 211 of the head controller 21. The switch controller 31 is connected to each of the switches and controls an ON/OFF operation of each of the switches in accordance with the image data and the waveform switching signal.

As preparation for measurement of a reverberation waveform, the nozzle state inspection apparatus 200 sets a switch connected to a nozzle to be measured to ON, and sets switches connected to nozzles not to be measured to OFF. In the following description, the nozzle to be measured is referred to as a "measurement target nozzle", and the nozzles not to be measured are referred to as "nozzles other than the measurement target nozzle". At the time of measuring a reverberation waveform, the switch connected to the measurement target nozzle is switched from ON to OFF, and the switches connected to the nozzles other than the measurement target nozzle are maintained to be OFF. Through this operation (hereinafter referred to as "first operation example"), the signal receiver 23 can acquire a reverberation waveform generated after the switch connected to the nozzle to be measured is switched to OFF.

Figure 3:
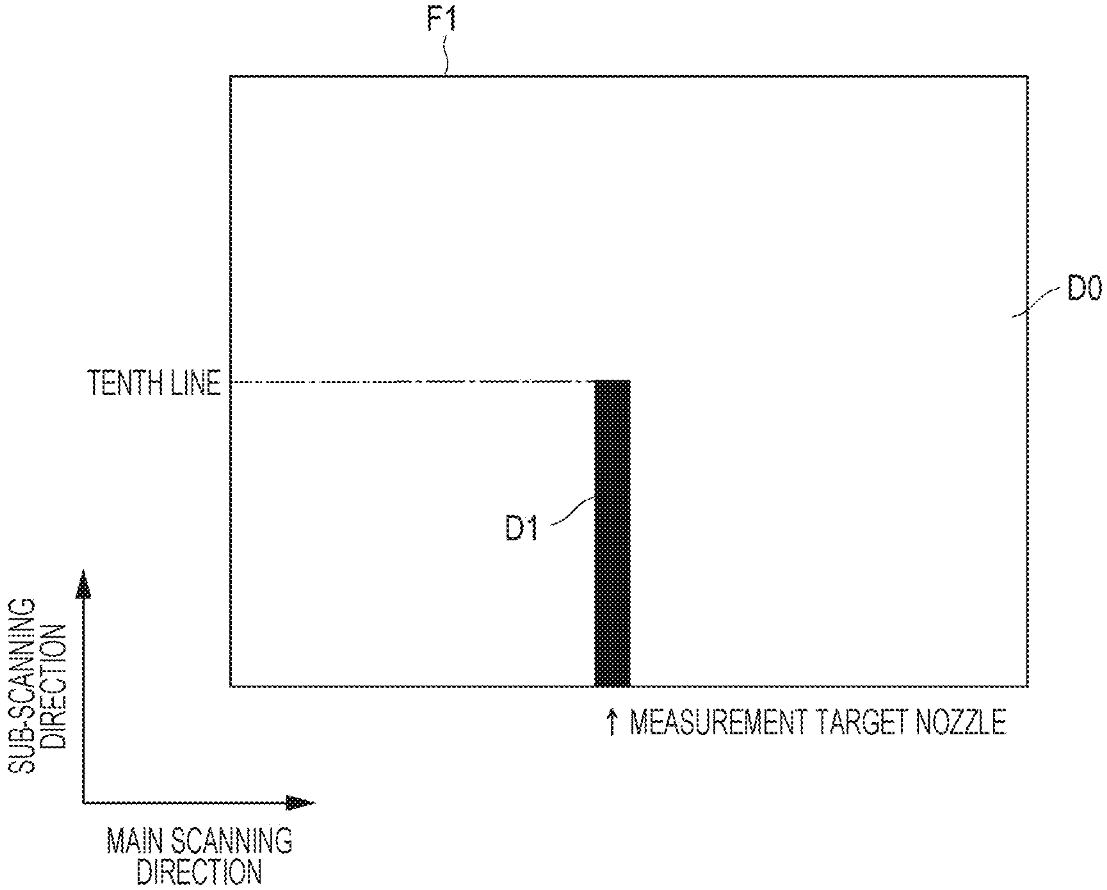
FIG. 3 is a diagram illustrating a first example of image data used in the nozzle state inspection apparatus using the two-channel switches.

Here, a first operation example of the nozzle state inspection apparatus 200 will be described in detail with reference to FIG. 3 to FIG. 6. FIG. 3 is a diagram illustrating a first example of the image data used in the nozzle state inspection apparatus 200 using the two-channel switch. In an image F1 illustrated in FIG. 3, a widthwise direction in the diagram represents a main scanning direction during image formation, and a direction from bottom to top intersecting with the main scanning direction (widthwise direction) represents a sub-scanning direction during the image formation. The position of a black image portion in the main scanning direction in the image F1 is a position corresponding to the measurement target nozzle. Here, image data of the black image portion corresponding to the measurement target nozzle is referred to as "image data D1", and image data of a white image portion is referred to as "image data DO". The image data D1 is image data of an image portion that needs to be printed, and the image data DO is image data of an image portion that does not needs to be printed.

The length of the image data D1 in the sub-scanning direction is, for example, 10 lines as illustrated in FIG. 3. The switch connected to the measurement target nozzle is set to ON during a period in which the inkjet head 30 ejects and scans liquid from the first line to the tenth line of the image data D1 along the sub-scanning direction, that is, during a period for driving the measurement target nozzle. In a period of the first to tenth lines, since the image data corresponding to the nozzles other than the measurement target nozzle is the image data DO, the nozzles other than the measurement target nozzle are not driven, and thus the switches connected to the nozzles other than the measurement target nozzle are set to OFF.

In the eleventh line, the image data corresponding to the measurement target nozzle is changed from the image data D1 to the image data D0. That is, the measurement target nozzle is switched from the driving period to a non-drive period, and the switch connected to the measurement target nozzle is switched from ON to OFF. At the timing of the switching, a reverberation waveform is generated in the measurement target nozzle. In the twelfth and subsequent lines, the image data corresponding to all the nozzles is the image data D0. Therefore, the switches connected to all the nozzles are maintained in the OFF state.

The data outputter 211 of the head controller 21 of the nozzle state inspection apparatus 200 outputs the image F1 stored in advance and the waveform switching signal to the switch controller 31 of the inkjet head 30. Then, the switch controller 31 controls the ON/OFF operation of each of the switches connected to the nozzles in accordance with the timing of outputting the drive waveform indicated in the waveform switching signal and various image data (the image data D1 and the image data D0) included in the image F1.

FIG. 4 is a diagram for explaining switching operations in the first operation example of the nozzle state inspection apparatus 200. FIG. 4 illustrates image data and a switching operation corresponding to the measurement target nozzle and image data and switching operations corresponding to the nozzles other than the measurement target nozzle.

In FIG. 4, a field of "line" indicates a number of each line along the sub-scanning direction of the image F1, for example, numbers "1" to "12". Note that the line numbers of a line "13" and subsequent lines are omitted in FIG. 4. A field of "measurement target nozzle" includes a field of "image data" indicating image data corresponding to the measurement target nozzle and a field of "switching operation" indicating a switching operation corresponding to the "image data". A field of "nozzles other than measurement target" includes a field of "image data" and a field of "switching operation", similarly to the field of "measurement target nozzle". As the "image data", for example, "D0" and "D1", that is, the image data D0 described with reference to FIG. 3 and the identifier of the image data D1 are illustrated. As the "switching operation", "ON" indicating a state of being set to ON, and "OFF" indicating a state of being set to OFF are illustrated.

As illustrated in FIG. 4, the "image data" of the "measurement target nozzle" is "D1" in the lines "1" to "10", and therefore, the "switching operation" corresponding to the measurement target nozzle is "ON" in accordance with the image data D1. Furthermore, the "image data" of the "nozzles other than the measurement target nozzle" is "D0" in the lines "1" to "10", and therefore, the "switching operations" corresponding to the nozzles other than the measurement target nozzle are "OFF" in accordance with the image data D0. The lines "1" to "10" are provided as a period for preliminary ejection for the 10 lines as preparation before measurement in order to stabilize an ejection operation of the measurement target nozzle.

Since the "image data" of the "measurement target nozzle" becomes "D0" in the line "11", the "switching operation" corresponding to the measurement target nozzle is switched to "OFF" in accordance with to the image data D0. In addition, since the "image data" of the "nozzles other than the measurement target nozzle" is "D0" in the line "11", the "switching operations" corresponding to the nozzles other than the measurement target nozzle is maintained to be "OFF" in accordance with the image data D0. Since the switching operation corresponding to the measurement target nozzle has been switched from "ON" to "OFF" in the line "11", a reverberation waveform is generated in the measurement target nozzle at the timing of the switching, and the reverberation waveform is acquired by the signal receiver 23.

Since the "image data" of the "measurement target nozzle" is "D0" from the line "12" to the last line, the "switching operation" corresponding to the measurement target nozzle is maintained to be "OFF" in accordance with the image data D0. Similarly, since the "image data" of the "nozzles other than the measurement target nozzle" is also "D0" from the line "12" to the last line, the "switching operations" corresponding to the nozzles other than the measurement target nozzle are also maintained in the "OFF" state in accordance with the image data D0.

Figure 5:
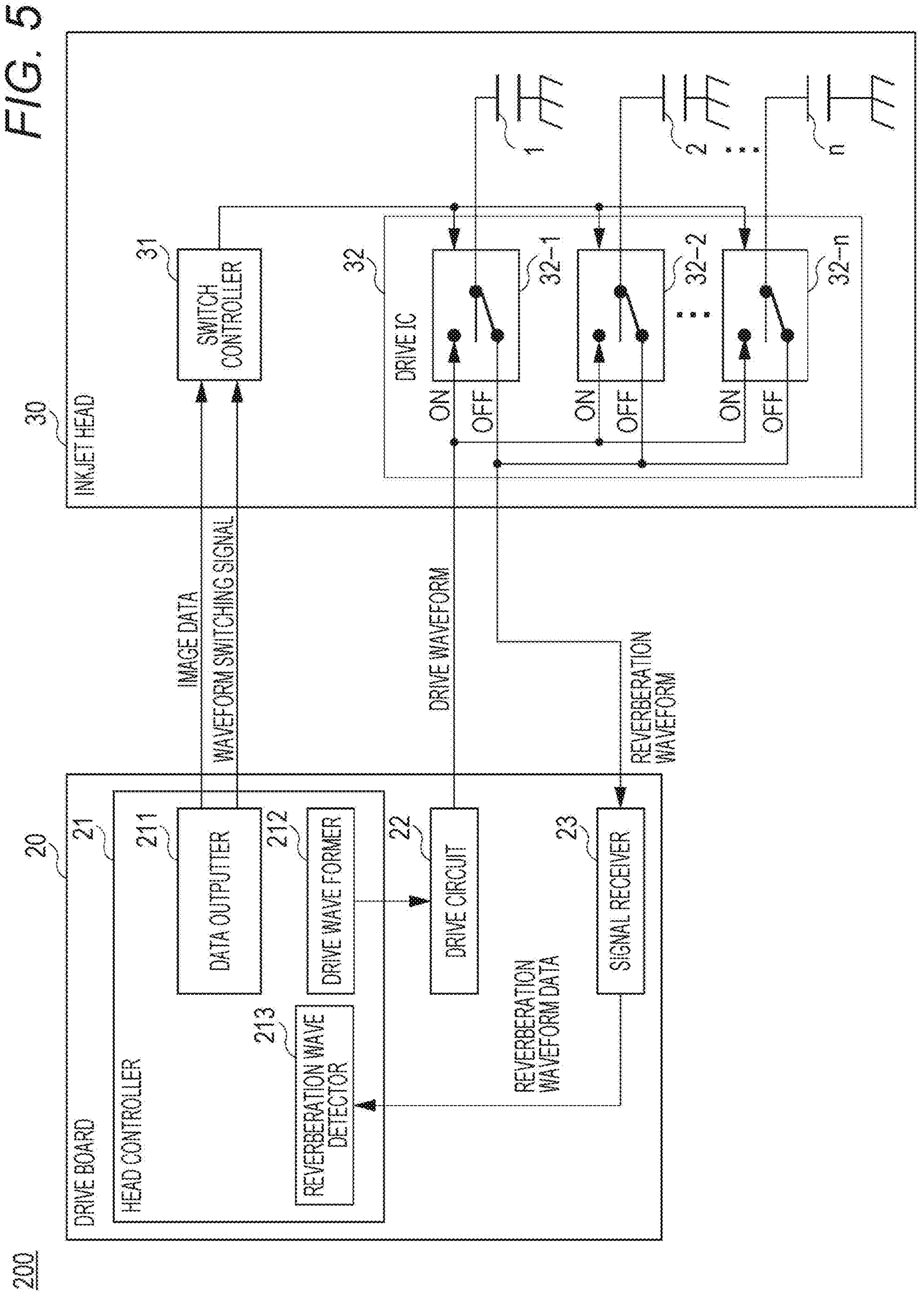
FIG. 5 is a diagram illustrating a switch state during a nozzle state inspection in the first operation example of the nozzle state inspection apparatus using the two-channel switches.

Next, in the first operation example of the nozzle state inspection apparatus 200, the state of each of the switches at the time of measurement of the reverberation waveform of the measurement target nozzle, that is, at the timing of the line "11" described in FIG. 4 will be described. FIG. 5 is a diagram illustrating a switch state during a nozzle state inspection in the first operation example of the nozzle state inspection apparatus 200. The nozzle state inspection apparatus 200 illustrated in FIG. 5 is the same as that illustrated in FIG. 2, and therefore, redundant description will be omitted. Here, it is assumed that the nozzle 1 is a measurement target nozzle and the nozzles 2 to n are nozzles other than the measurement target nozzle.

As illustrated in FIG. 5, during the measurement of the reverberation waveform of the nozzle 1 (measurement target nozzle), the switch 32-1 connected to the nozzle 1 is set to "OFF". The switches 32-2 to **32-*n* connected to the nozzles 2 to n (nozzles other than the measurement target nozzle), respectively, are set to OFF. Note that the previous state of the switch 32-1, that is, the state at the timing of the "tenth" line described in FIG. 4 is a state where the switch 32-1 is set to "ON". The previous states of the switches 32-2 to 32-*n* are states in which the switches 32-2 to 32-*n*** are set to "OFF".

Figure 6A:
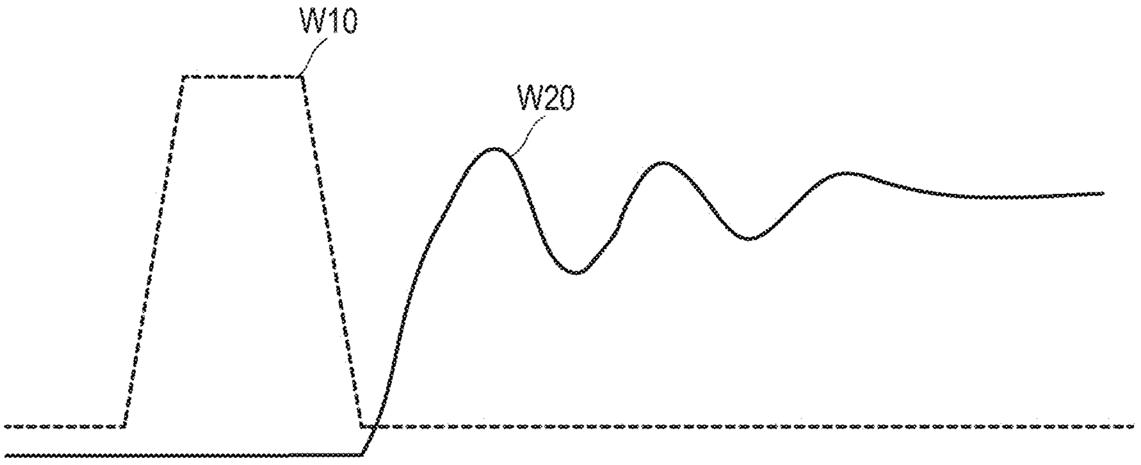
FIG. 6A and FIG. 6B are diagrams for explaining attenuation of a reverberation waveform in the first operation example of the nozzle state inspection apparatus using the two-channel switches.
Figure 6B:
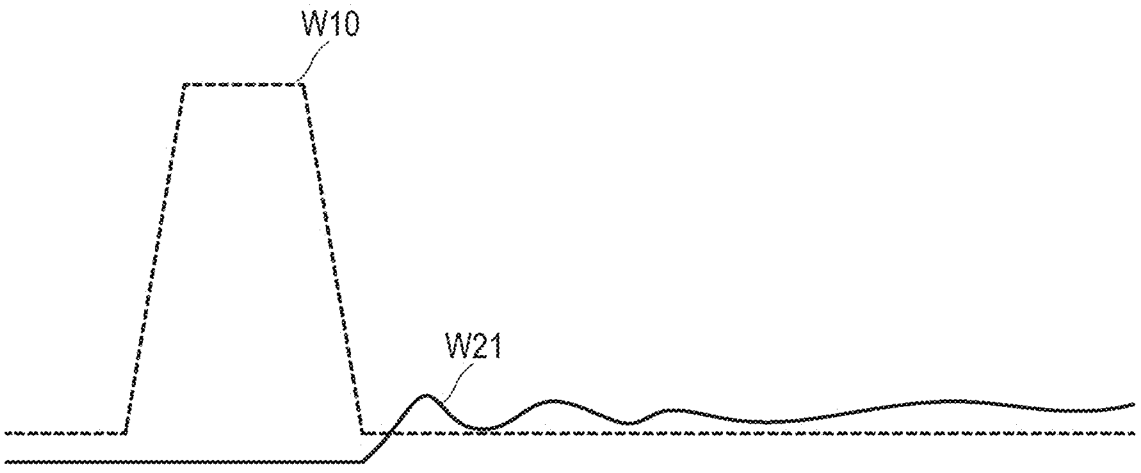

Next, a problem in the first operation example of the nozzle state inspection apparatus 200 will be described. FIG. 6A and FIG. 6B are diagrams for explaining attenuation of reverberation waveforms in the first operation example of the nozzle state inspection apparatus 200. FIG. 6A is a diagram illustrating an image of a reverberation waveform generated in the measurement target nozzle (nozzle 1), that is, the reverberation waveform that is not attenuated. FIG. 6B is a diagram illustrating an image of a reverberation waveform generated in the measurement target nozzle (nozzle 1) measured in the first operation example of the nozzle state inspection apparatus 200.

A drive waveform W10 illustrated in FIG. 6A represents the drive waveform. A waveform W20 illustrated in FIG. 6A represents the reverberation waveform generated in the nozzle 1 when the switch 32-1 connected to the nozzle 1 is switched from "ON" to "OFF". As illustrated in FIG. 6A, after the drive waveform W10 is set to OFF, the reverberation waveform (waveform W20) is generated.

Since the drive waveform W10 illustrated in FIG. 6B is the same as the drive waveform W10 illustrated in FIG. 6A, redundant description will be omitted. A waveform W21 illustrated in FIG. 6B represents the reverberation waveform generated in the nozzle 1 measured in the first operation example of the nozzle state inspection apparatus 200. As can be seen from a comparison between the waveform 6A illustrated in FIG. W20 and the waveform 6B illustrated in FIG. W21, the waveform W21 is obtained by attenuating the waveform W20. This is because the switches 32-2 to **32-*n* connected to the nozzles 2 to n (nozzles other than the measurement target nozzle), respectively, are set to OFF and the nozzles electrically equivalent to capacitors are connected in parallel, thereby forming a large capacity. This large capacity causes a problem of the attenuation of the reverberation waveform in the measurement target nozzle. As a method of solving this problem, a method of setting the switches 32-2 to 32-*n*** to ON during the reverberation waveform measurement is conceivable. Such an operation will be described below as a second operation example.

Figure 7:
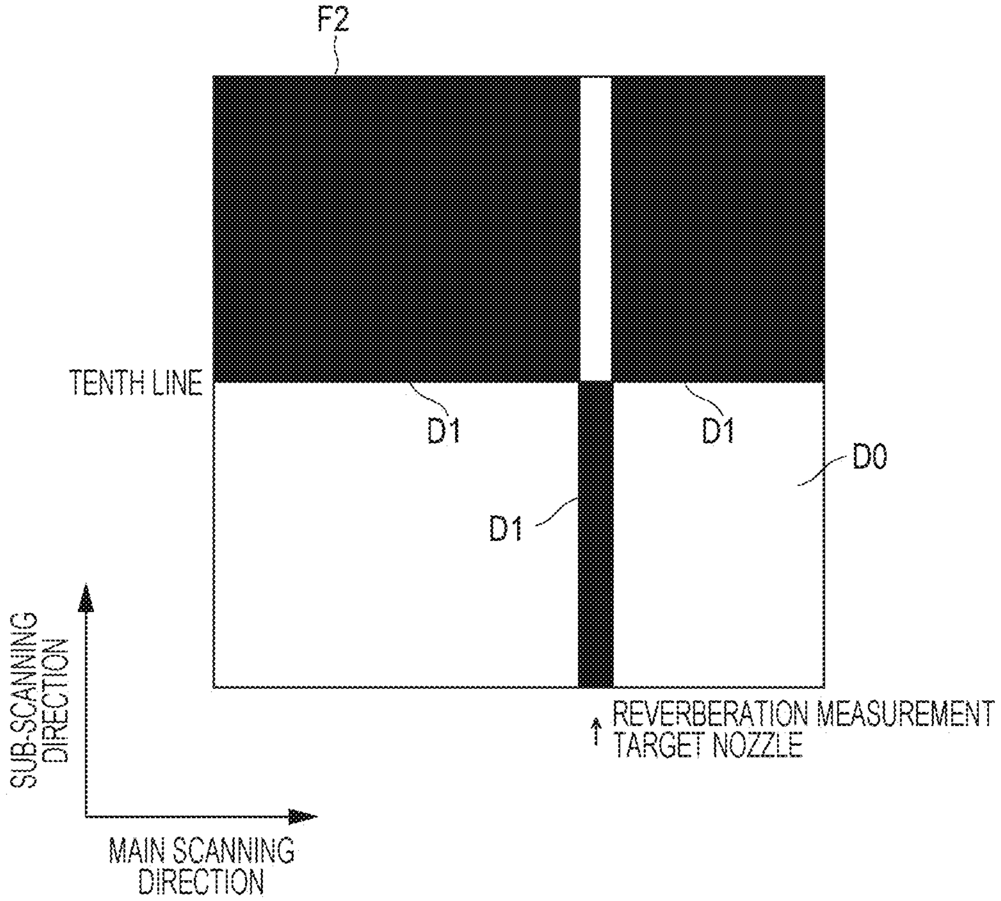
FIG. 7 is a diagram illustrating a second example of the image data used in the nozzle state inspection apparatus using the two-channel switches.

Next, the second operation example of the nozzle state inspection apparatus 200 will be described in detail with reference to FIG. 7 to FIG. 10. FIG. 7 is a diagram illustrating a second example of the image data used in the nozzle state inspection apparatus 200. The main scanning direction and the sub-scanning direction illustrated in FIG. 7 are the same as the respective directions described with reference to FIG. 3, and therefore, redundant description will be omitted. Furthermore, black image portions of an image F2 illustrated in FIG. 7 and image data D1 corresponding to the black image portions, and white image portions of the image F2 and image data D0 corresponding to the white image portions are also the same as those described in FIG. 3, and therefore, redundant description will be omitted.

As can be seen from a comparison between FIG. 7 and FIG. 3, in FIG. 7, the image data corresponding to the positions of the nozzles other than the measurement target nozzle in the period (the first to tenth lines) for driving the measurement target nozzle is the same as that in FIG. 3 and is the image data D0. That is, in this period, each of the switches operates in the same manner as in the first operation example.

At the time of the reverberation waveform measurement (the eleventh line), the image data corresponding to the measurement target nozzle is changed from the image data D1 to the image data D0. That is, the measurement target nozzle is switched from the drive period to a non-drive period, and the switch connected to the measurement target nozzle is switched from ON to OFF. On the other hand, as illustrated in FIG. 7, unlike the image data D0 in the first operation example, the image data corresponding to the positions of the nozzles other than the measurement target nozzle is changed from the image data D0 to the image data D1 in the second operation example. That is, at the time of the reverberation waveform measurement (the eleventh line), the switches connected to the nozzles other than the measurement target nozzle are switched from OFF to ON, and the nozzles other than the measurement target nozzle are driven.

During a period of the eleventh line and subsequent lines, the image data corresponding to the measurement target nozzle is the image data D0, and the switch connected to the measurement target nozzle is maintained to be OFF. The image data corresponding to the positions of the nozzles other than the measurement target nozzle is the image data D1, and the nozzles other than the measurement target nozzle perform an ejection operation to print the image data D1, and thus the switches connected to the nozzles other than the measurement target nozzle are maintained to be ON.

FIG. 8 is a diagram for explaining switching operations in the second operation example of the nozzle state inspection apparatus 200. Since a configuration of a table illustrated in FIG. 8 is the same as the configuration of the table illustrated in FIG. 4, redundant description will be omitted.

As illustrated in FIG. 8, in the lines "1" to "10", the "image data" and the "switching operation" of the "measurement target nozzle" and the "image data" and the "switching operations" of the "nozzles other than the measurement target nozzle" are the same as those illustrated in FIG. 4.

The "image data" of the "measurement target nozzle" becomes "D0" in the line "11" (during the reverberation waveform measurement), and therefore, the "switching operation" corresponding to the measurement target nozzle is switched to "OFF" in accordance with the image data D0. In addition, since the "image data" of the "nozzles other than the measurement target nozzle" becomes "D1" in the line "11", the "switching operations" corresponding to the nozzles other than the measurement target nozzle are switched to "ON" in accordance with the image data D1.

Since the "image data" of the "measurement target nozzle" is "D0" from the line "12" to the last line, the "switching operation" corresponding to the measurement target nozzle is maintained to be "OFF" in accordance with the image data D0. In addition, since the "image data" of the "nozzles other than the measurement target nozzle" is "D1" from the line "12" to the last line, the "switching operations" corresponding to the nozzles other than the measurement target nozzle are maintained in the "ON" state in accordance with the image data D1.

Figure 9:
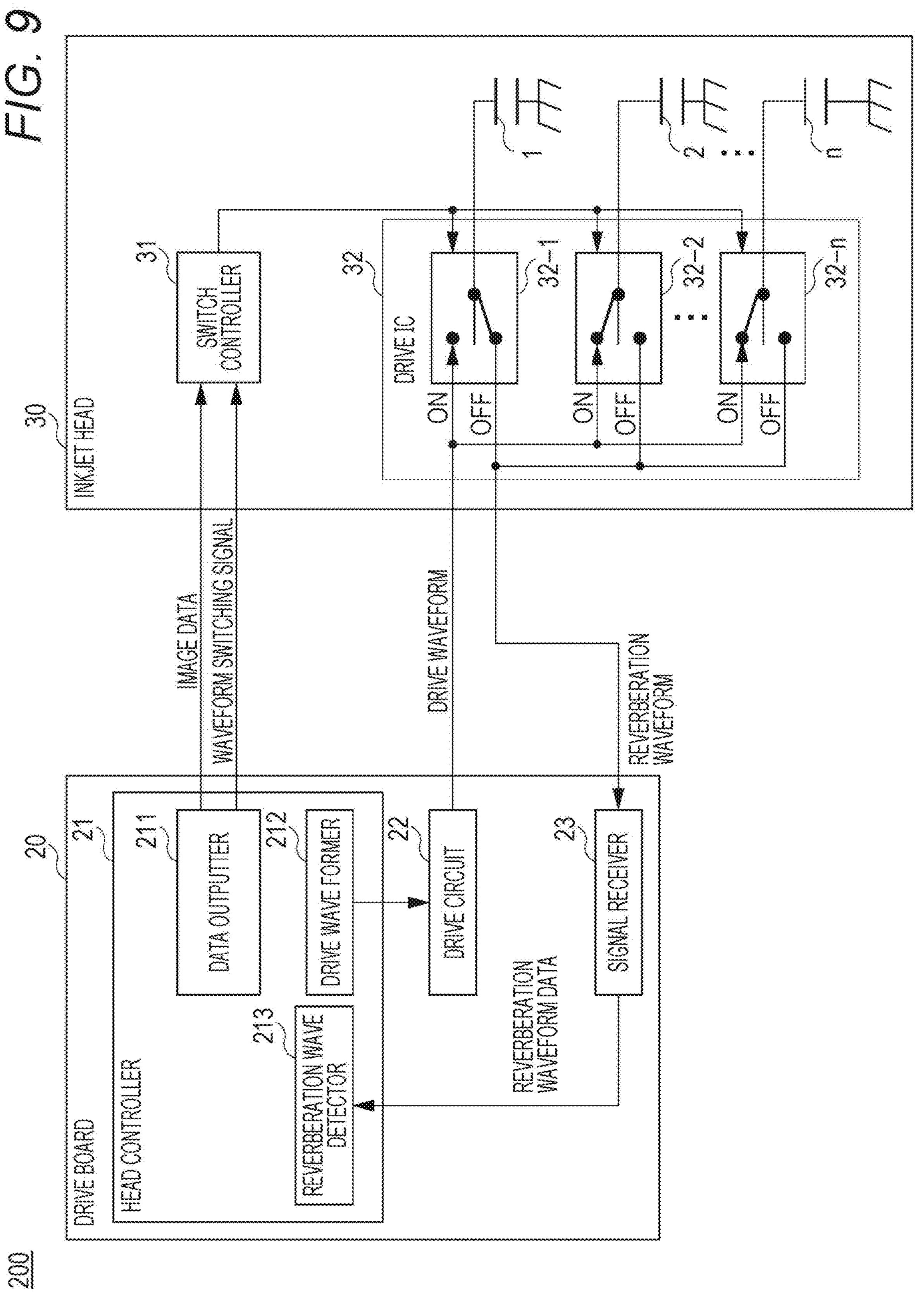
FIG. 9 is a diagram illustrating a switch state during a nozzle state inspection in the second operation example of the nozzle state inspection apparatus using the two-channel switches.

Next, in the second operation example, the state of each of the switches of the nozzle state inspection apparatus 200 at the time of measuring the reverberation waveform of the measurement target nozzle, that is, at the timing of the line "11" will be described. FIG. 9 is a diagram illustrating a switch state during a nozzle state inspection in the second operation example of the nozzle state inspection apparatus 200. Since the nozzle state inspection apparatus 200 illustrated in FIG. 9 is the same as that illustrated in FIG. 2, redundant description will be omitted. Furthermore, similarly to the first operation example, it is assumed that the nozzle 1 is the measurement target nozzle and the nozzles 2 to n are the nozzles other than the measurement target nozzle.

As illustrated in FIG. 9, during the measurement of the reverberation waveform of the nozzle 1 (measurement target nozzle), the switch 32-1 connected to the nozzle 1 is set to "OFF". The switches 32-2 to **32-*n* connected to the nozzles 2 to n (nozzles other than the measurement target nozzle), respectively, are set to "ON". Note that the previous state of the switch 32-1, that is, the state at the timing of the tenth line is a state in which the switch 32-1 is set to "ON". The previous states of the switches 32-2 to 32-*n* are states in which the switches 32-2 to 32-*n*** are set to "OFF".

Figure 10:
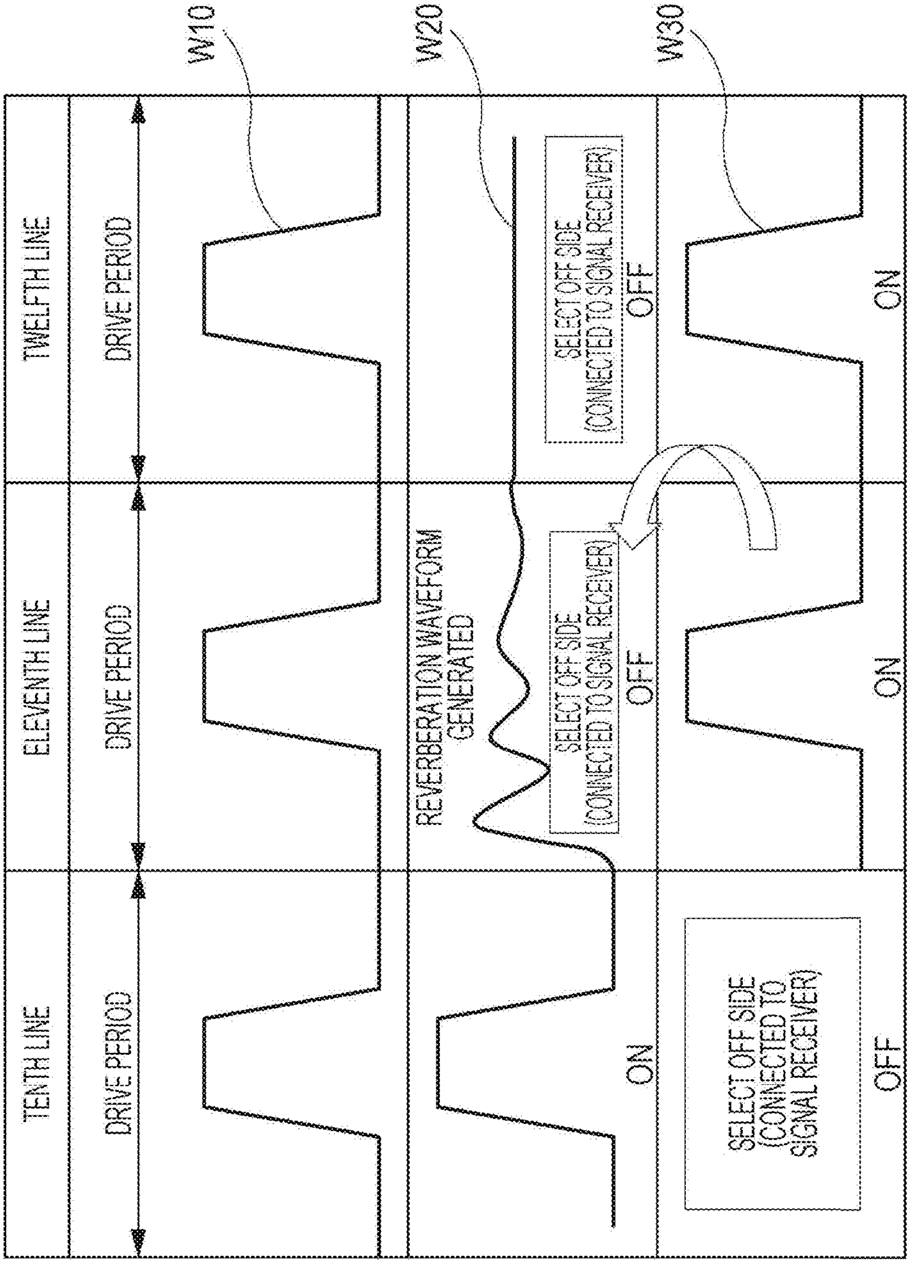
FIG. 10 is a diagram for explaining crosstalk in the second operation example of the nozzle state inspection apparatus using the two-channel switches.

Next, a problem in the second operation example of the nozzle state inspection apparatus 200 will be described. FIG. 10 is a diagram for explaining crosstalk in the second operation example of the nozzle state inspection apparatus 200. FIG. 10 illustrates a drive waveform W10 in a period of each of the tenth to twelfth lines, a waveform W20 which is a reverberation waveform in the measurement target nozzle, and a waveform W30 in each of the nozzles other than the measurement target nozzle in order from the top.

Since the drive waveform W10 is output for each line of the image F2, as illustrated in FIG. 10, the drive waveform W10 corresponding to each of the tenth to twelfth lines is the same. That is, a drive period of the drive waveform W10 is the same as the time for the inkjet head 30 to scan one line of the image F2.

The waveform W20 of the measurement target nozzle is the same as the drive waveform W10 in the tenth line. This is because the image data corresponding to the measurement target nozzle is the image data D1 in the tenth line and the switch connected to the measurement target nozzle is set to ON for the tenth line. The image data corresponding to the measurement target nozzle is the image data D0 in the eleventh and twelfth lines, the measurement target nozzle is switched from the drive period to a non-drive period, and the switch connected to the measurement target nozzle is switched from ON to OFF (connected to the signal receiver 23) for the eleventh and twelfth lines. Therefore, in a period of the eleventh and twelfth lines, the reverberation waveform (waveform W20) is generated in the measurement target nozzle.

No waveform is present in the nozzles other than the measurement target nozzle in the tenth line. This is because the image data corresponding to the nozzles other than the measurement target nozzle is the image data D0 in the tenth line, the nozzles other than the measurement target nozzle are not driven and the switches connected to the nozzles other than the measurement target nozzle are maintained in the OFF state (connected to the signal receiver 23) for the tenth line. In the eleventh and twelfth lines, the waveform W30 in each of the nozzles other than the measurement target nozzle is the same as the drive waveform W10. This is because the image data corresponding to the nozzles other than the measurement target nozzle is the image data D1 in the eleventh and twelfth lines, the nozzles other than the measurement target nozzle are driven, and the switches connected to the nozzles other than the measurement target nozzle are set to ON for the eleventh and twelfth lines.

As illustrated in FIG. 10, during the measurement of the reverberation waveform of the measurement target nozzle, that is, during a period of the eleventh line, since the nozzles other than the measurement target nozzle are driven, crosstalk between the drive waveform for each of the nozzles other than the measurement target nozzle and the reverberation waveform of the measurement target nozzle occurs. Since the reverberation waveform (waveform W20) is a weak signal, the reverberation waveform is likely to be affected by the crosstalk.

First Embodiment

Embodiments for implementing the present invention will be described with reference to the accompanying drawings. The present invention solves the problems in the first operation example and the second operation example of the nozzle state inspection apparatus 200 described above. The nozzle state inspection apparatus 500 according to the present embodiment includes each component of the nozzle state inspection apparatus 200 illustrated in FIG. 2. Only configurations and operations of the nozzle state inspection apparatus 500 that are different from those of the nozzle state inspection apparatus 200 will be described, and the description of the same configurations and operations as those of the nozzle state inspection apparatus 200 will be omitted.

In the nozzle state inspection apparatus 500, the drive wave former 212 of the head controller 21 forms a drive waveform including first drive output (see W51 illustrated in FIG. 12 which will be described later) which will be described later and second drive output (see W52 illustrated in FIG. 12 which will be described later) which will be described later. Then, the drive wave former 212 outputs the formed drive waveform to the drive IC 32 of the inkjet head 30 and applies the drive waveform to each of the nozzles.

The head controller 21 including the data outputter 211, the drive wave former 212, and the reverberation wave detector 213, and the signal receiver 23 (see FIG. 2) in the nozzle state inspection apparatus 500 are collectively referred to as an "inspector". The inspector controls whether or not to apply the drive waveform to each of the nozzles in accordance with the drive waveform and executes a nozzle state inspection process of inspecting (analyzing) a measurement target nozzle for abnormality by acquiring a reverberation waveform generated in the measurement target nozzle. The nozzle state inspection process in the inspector will be described in detail later with reference to FIG. 18. The drive wave former 212, the reverberation wave detector 213, and the like of the inspector can be implemented by a hardware processor.

In addition, each of the two-channel switches connected to each of the plurality of nozzles included in the inkjet head 30 operates so as to connect any one of the drive wave former 212 and the signal receiver 23 included in the inspector and configured to acquire the reverberation waveform to the nozzle under control by the inspector.

Figure 11:
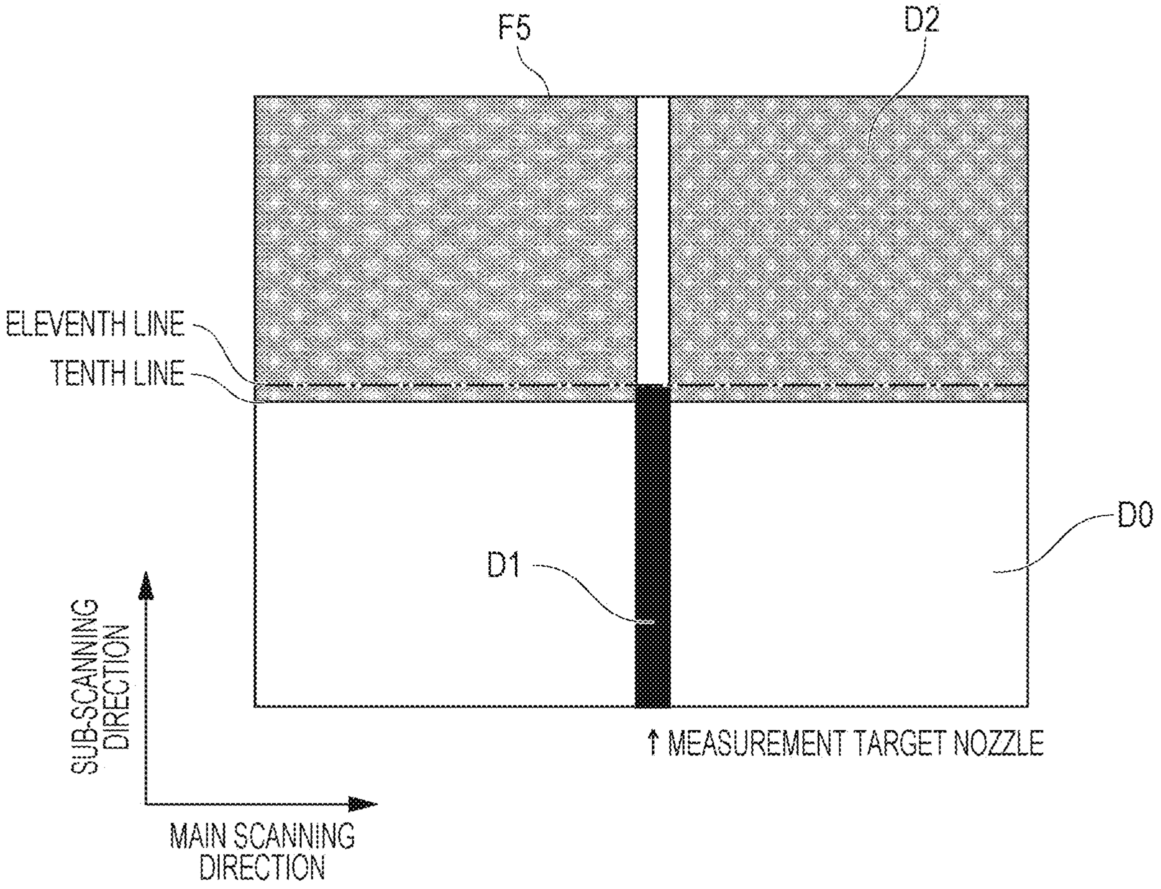
FIG. 11 is a diagram illustrating an example of image data used in a nozzle state inspection apparatus according to a first embodiment of the present invention.

First, image data used in the nozzle state inspection apparatus 500 according to the present embodiment will be described. FIG. 11 is a diagram illustrating an example of the image data used in the nozzle state inspection apparatus 500 according to the present embodiment. A main scanning direction and a sub-scanning direction illustrated in FIG. 11 are the same as the respective directions described with reference to FIG. 3, and thus redundant description will be omitted.

An image F5 illustrated in FIG. 11 includes image data D1 (first image data), image data D0 (second image data), and image data D2 (third image data). The first image data (image data D1) is image data corresponding to the measurement target nozzle. The second image data (image data D0) is image data of a non-printed image portion (white image portion) in the image F5.

The third image data (image data D2) is image data corresponding to the nozzles other than the measurement target nozzle. In FIG. 11, as an example, the first image data (image data D1) is image data of a black image portion having a length of 11 lines in the sub-scanning direction. The third image data (image data D2) is image data of a gray image portion in the tenth line and the subsequent lines. Note that the image F5 is registered in advance in a storage device 504 or the like to be described later. In addition, the images of the first image data and the third image data are not limited to the black image and the gray image and may be images in arbitrary colors as long as the first image data and the third image data can be distinguished from each other.

The inspector of the nozzle state inspection apparatus 500 controls the operation of each of the two-channel switches as control of whether or not to apply the drive waveform to each of the nozzles in accordance with the type of image data included in the image F5 registered in advance. Specifically, when the first image data is transferred to the measurement target nozzle and the second image data is transferred to the nozzles other than the measurement target nozzle, the inspector controls the operation of each of the two-channel switches such that the drive wave former 212 is connected to the measurement target nozzle and the signal receiver 23 is connected to the nozzles other than the measurement target nozzle.

When the first image data is transferred to the measurement target nozzle and the third image data is transferred to the nozzles other than the measurement target nozzle, and when the first drive output is to be output, the inspector controls the operation of each of the two-channel switches such that the drive wave former 212 is connected to the measurement target nozzle and the signal receiver 23 is connected to the nozzles other than the measurement target nozzle. When the first image data is transferred to the measurement target nozzle and the third image data is transferred to the nozzles other than the measurement target nozzle, and when the second drive output is to be output, the inspector controls the operation of each of the two-channel switches such that the signal receiver 23 is connected to the measurement target nozzle and the drive wave former 212 is connected to the nozzles other than the measurement target nozzle.

Figure 12:
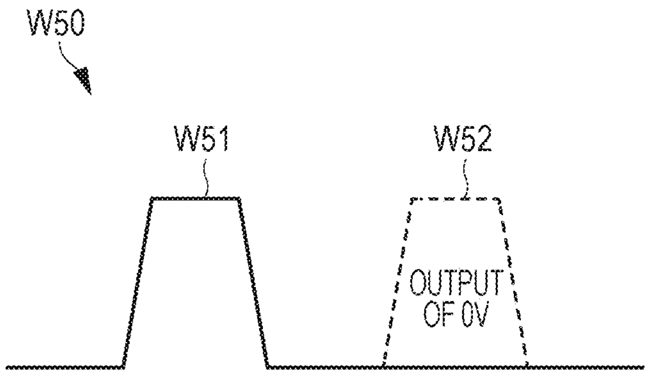
FIG. 12 is a diagram illustrating an example of a drive waveform used in the nozzle state inspection apparatus according to the first embodiment of the present invention.

Next, the drive waveform used in the nozzle state inspection apparatus 500 will be described. FIG. 12 is a diagram illustrating an example of the drive waveform used in the nozzle state inspection apparatus 500 according to the present embodiment. A drive waveform W50 illustrated in FIG. 12 is formed by the drive wave former 212 and is applied to each of the nozzles by the drive circuit 22 for each line of the image F5. The drive waveform W50 includes first drive output W51 as the first drive output and second drive output W52 as the second drive output. The first drive output (drive output W51) corresponds to a voltage that causes a reverberation waveform to be generated in the nozzle, and the second drive output (drive output W52) corresponds to a voltage (for example, 0 volts) that is lower than the voltage that causes the reverberation waveform to be generated in the nozzle.

Figure 13:
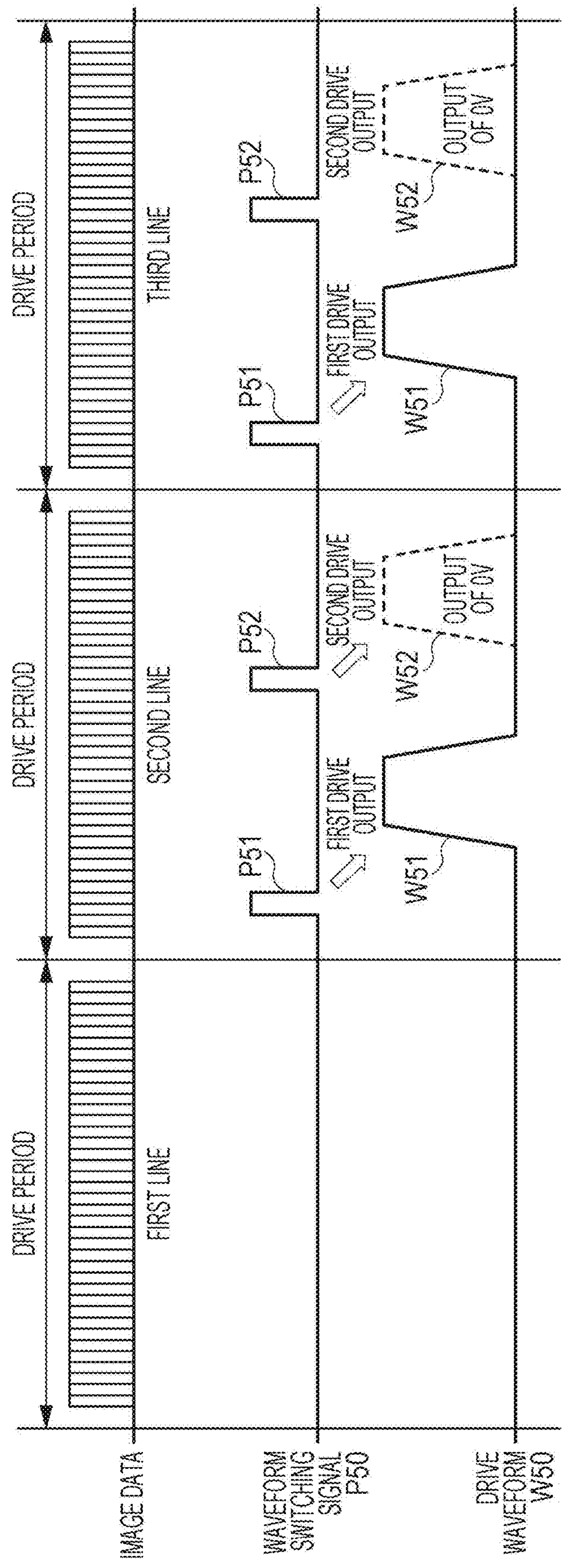
FIG. 13 is a diagram for explaining a correspondence relationship between image data, a waveform switching signal, and a drive waveform in the nozzle state inspection apparatus according to the first embodiment of the present invention.

The drive IC 32 (see FIG. 2) of the inkjet head 30 controls the switching between ON and OFF of each of the switches (32-1 to 32-*n*) in accordance with the various image data included in the image F5 input from the data outputter 211 of the head controller 21 and a waveform switching signal P50 (see FIG. 13).

FIG. 13 is a diagram for explaining a correspondence relationship between the image data, the waveform switching signal P50, and the drive waveform W50 in the nozzle state inspection apparatus 500 according to the present embodiment.

FIG. 13 illustrates the image data, the waveform switching signal P50, and the drive waveform W50 in order from the top. Each of drive periods illustrated in FIG. 13 corresponds to each line of the image data because a period for transferring each line of the image data is set as a drive period of the drive waveform W50 during printing.

In a period for transferring the image data of the first line, the waveform switching signal P50 and the drive waveform W50 are not output. In a period for transferring the image data of the second line, the drive waveform W50 for printing the image data of the first line is output. Similarly, in a period for transferring the image data of the third line, the drive waveform W50 for printing the image data of the second line is output. FIG. 13 illustrates only the image data of the first to third lines, the waveform switching signal P50 corresponding to the image data of the first to third lines, and the drive waveform W50 corresponding to the image data of the first to third lines. The image data of the fourth and subsequent lines, the waveform switching signal P50 corresponding to the image data of the fourth and subsequent lines, and the drive waveform W50 corresponding to the image data of the fourth and subsequent lines are similar to the image data of the second and third lines, and those corresponding to the image data of the second and third lines, illustration and description thereof are omitted.

The waveform switching signal P50 is a pulse signal and includes a waveform switching signal P51 for outputting the first drive output W51 and a waveform switching signal P52 for outputting the second drive output W52. Similarly to the drive waveform W50, the waveform switching signal P50 is output for each line of the image data, that is, for each drive period. When detecting the waveform switching signal P51, the drive wave former 212 outputs the first drive output W51. When detecting the waveform switching signal P52, the drive wave former 212 outputs the second drive output W52.

Next, an operation of each of the switches based on a control command of the inspector, that is, various image data included in the image F5 and the waveform switching signal P52 will be described. The inspector outputs, to the switch controller 31 of the inkjet head 30, a command (various types of image data and the waveform switching signal P52) to control the operation of each of the switches. The switch controller 31 sets, in accordance with the control command of the inspector, the switch connected to the nozzle (measurement target nozzle) corresponding to the position of the image data D1 in the main scanning direction to ON when the waveform switching signal P51 is input to the switch controller 31, and sets, in accordance with the control command of the inspector, the switch to OFF when the waveform switching signal P52 is input to the switch controller 31. The switch controller 31 also sets the switches connected to the nozzles (nozzles other than the measurement target nozzle) corresponding to positions of the image data D2 in the main scanning direction to OFF when the waveform switching signal P51 is input to the switch controller 31 and sets the switches to ON when the waveform switching signal P52 is input to the switch controller 31. Furthermore, the switch controller 31 sets the switches connected to the nozzles corresponding to positions of the image data D0 in the main scanning direction to OFF.

FIG. 14 is a diagram for explaining switching operations in the nozzle state inspection apparatus 500 according to the present embodiment. Since a configuration of a table illustrated in FIG. 14 is the same as the configuration of the table illustrated in FIG. 4, redundant description will be omitted.

As illustrated in FIG. 14, "image data" of the "measurement target nozzle" is "D1" in the lines "1" to "10". In a period of the first to tenth lines, the "switching operation" of the switch corresponding to the measurement target nozzle is set to ON when the waveform switching signal P51 is input to the switch controller 31 and is set to OFF when the waveform switching signal P52 is input to the switch controller 31. That is, in the period of the first to tenth lines, the switching operation corresponding to the measurement target nozzle is an operation of switching from ON to OFF ("ON to OFF" illustrated in FIG. 14) in accordance with the waveform switching signal P50. On the other hand, in the period of the first to tenth lines, the "image data" of the "nozzles other than the measurement target nozzle" is "D0". In the period of the first to tenth lines, the "switching operation" of each of the switches corresponding to the nozzles other than the measurement target nozzle is an operation of maintaining the OFF state ("OFF to OFF" illustrated in FIG. 14).

The "image data" of the "measurement target nozzle" is "D1" In the line "11" (during reverberation waveform measurement), and therefore the "switching operation" of the switch corresponding to the "measurement target nozzle" is "ON to OFF", similarly to the "switching operation" in the lines "1" to "10". In addition, the "image data" of the "nozzles other than the measurement target nozzle" is "D2" in the line "11", the switches connected to the nozzles other than the measurement target nozzle are set to OFF when the waveform switching signal P51 is input to the switch controller 31 and are set to ON when the waveform switching signal P52 is input to the switch controller 31. Therefore, the "switching operation" of each of the switches corresponding to the "nozzles other than the measurement target nozzle" is "OFF to ON".

The "image data" of the "measurement target nozzle" is "D0" from the line "12" to the last line. In a period from the line "12" to the last line, the "switching operation" of the switch corresponding to the measurement target nozzle is an operation of maintaining the OFF state ("OFF to OFF" illustrated in FIG. 14). In addition, the "image data" of the "nozzles other than the measurement target nozzle" is "D2" from the line "12" to the last line. In the period from the line "12" to the last line, the "switching operation" of each of the switches corresponding to the "nozzles other than the measurement target nozzle" is the same as that for the line "11" and is "OFF to ON".

Figure 15:
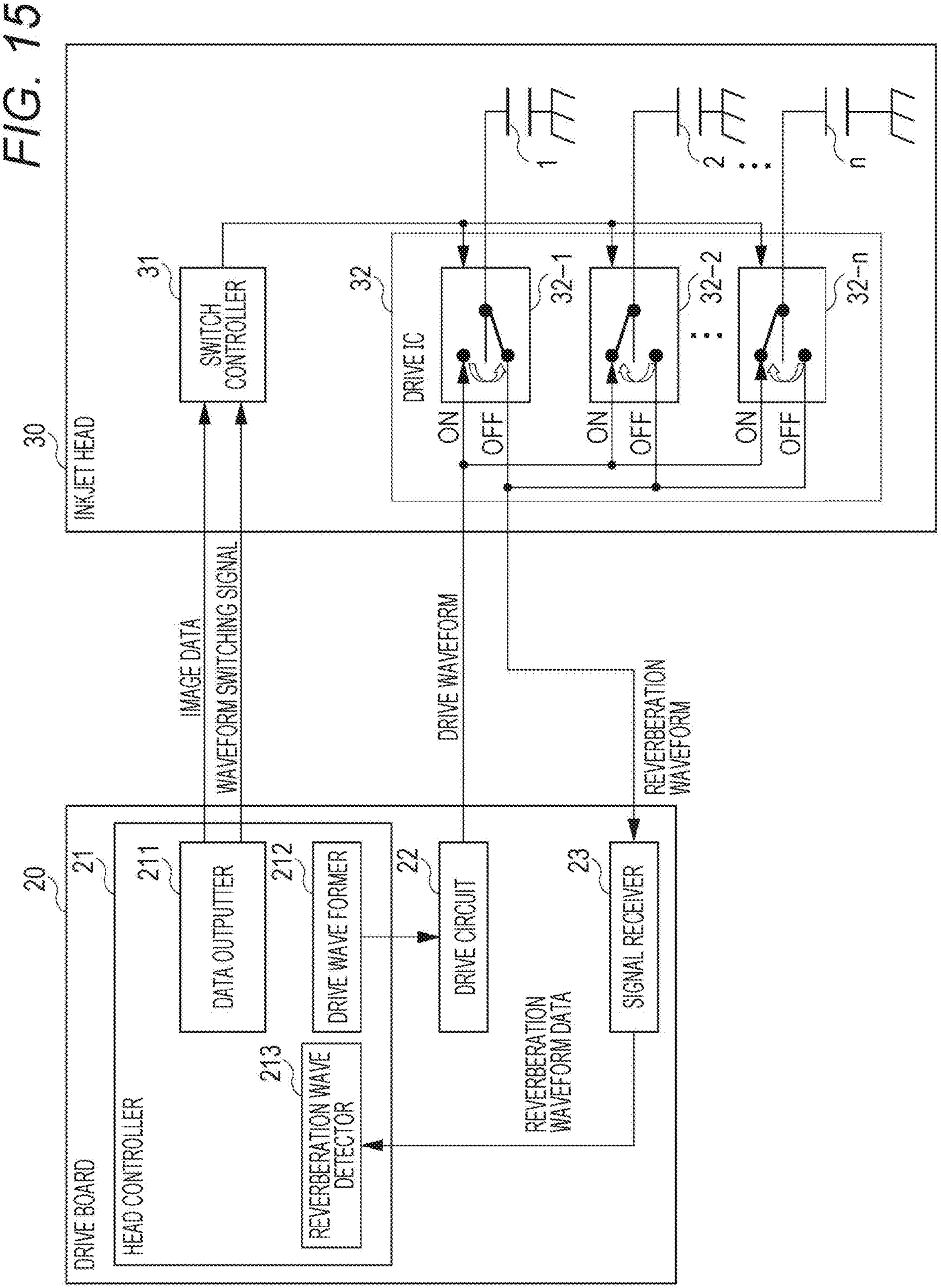
FIG. 15 is a diagram illustrating a switch state during a nozzle state inspection in the nozzle state inspection apparatus according to the first embodiment of the present invention.

Next, states of the switches of the nozzle state inspection apparatus 500 at the time of measuring the reverberation waveform of the measurement target nozzle, that is, at the timing of the line "11" will be described. FIG. 15 is a diagram illustrating a switch state during a nozzle state inspection of the nozzle state inspection apparatus 500. The nozzle state inspection apparatus 500 illustrated in FIG. 15 is the same as that illustrated in FIG. 2, and therefore, redundant description will be omitted. Here, the nozzle 1 is set as a measurement target nozzle, and the nozzles 2 to n are set as nozzles other than the measurement target nozzle.

As illustrated in FIG. 15, at the time of the measurement of the reverberation waveform of the nozzle 1 (measurement target nozzle), the switch 32-1 connected to the nozzle 1 is switched from ON to OFF. The switches 32-2 to **32-*n* connected to the nozzles 2** to n (nozzles other than the measurement target nozzle), respectively, are switched from OFF to ON.

Figure 16:
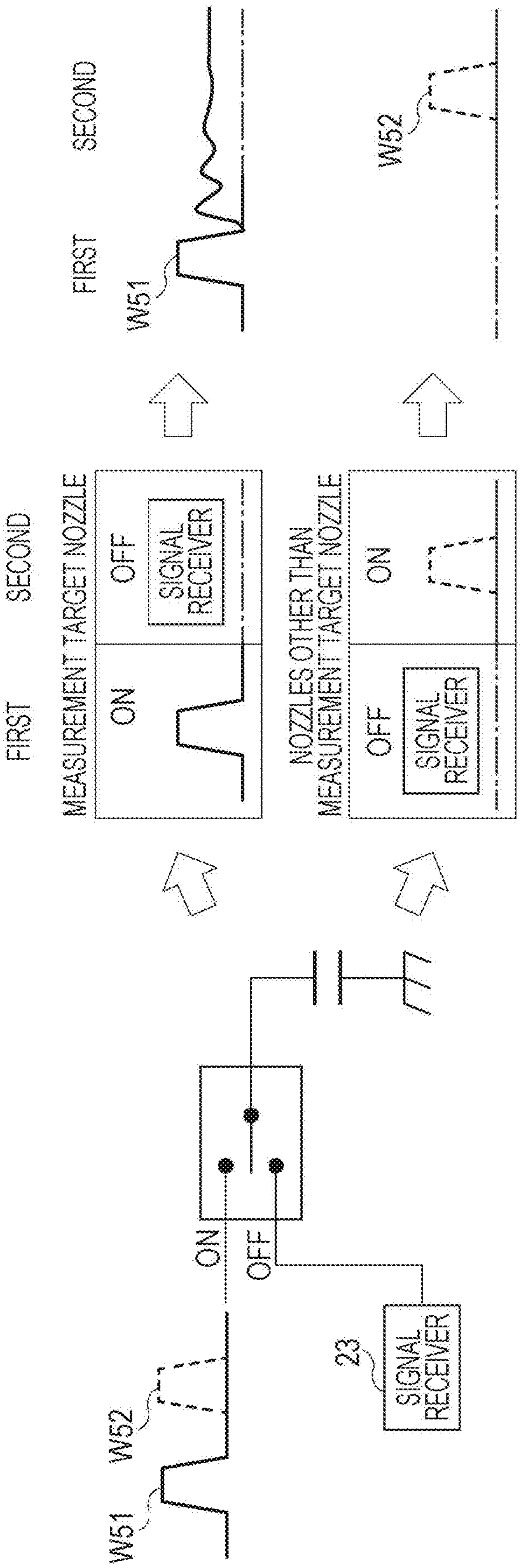
FIG. 16 is a diagram for explaining a signal waveform applied to a nozzle during reverberation waveform measurement in the nozzle state inspection apparatus according to the first embodiment of the present invention.

Next, signal waveforms to be applied to each of the measurement target nozzle and the nozzles other than the measurement target nozzle in the operating state of the nozzle state inspection apparatus 500 illustrated in FIG. 15 during reverberation waveform measurement will be described. FIG. 16 is a diagram for explaining a signal waveform applied to a nozzle during reverberation waveform measurement in the nozzle state inspection apparatus 500 according to the present embodiment. FIG. 16 illustrates only the one nozzle and a switch connected to the nozzle for convenience of description. A drive waveform W50 having first drive output W51 and second drive output W52 is input to an ON-side input terminal of the switch. An OFF-side input terminal of the switch is connected to the signal receiver 23 of the nozzle state inspection apparatus 500.

First, the measurement target nozzle will be described. As illustrated in FIG. 16, in the reverberation waveform measurement (see the line "11" illustrated in FIG. 14), when the first drive output W51 is input to the switch, the switch is set to ON and the drive output W51 is applied to the measurement target nozzle. When the second drive output W52 is input to the switch, the switch is switched from ON to OFF, a reverberation waveform is generated in the measurement target nozzle, and the reverberation waveform is acquired by the signal receiver 23 connected to the OFF-side input terminal of the switch.

Next, the nozzles other than the measurement target nozzle will be described. As illustrated in FIG. 16, in the reverberation waveform measurement, when the first drive output W51 is input to the switch, the switch is set to OFF, that is, the switch is connected to the signal receiver 23, and thus the drive output W51 is not applied to the nozzles other than the measurement target nozzle. When the second drive output W52 is input to the switch, the switch is switched from OFF to ON, and the drive output W52 of 0 V is applied to the nozzles other than the measurement target nozzle.

Figure 17:
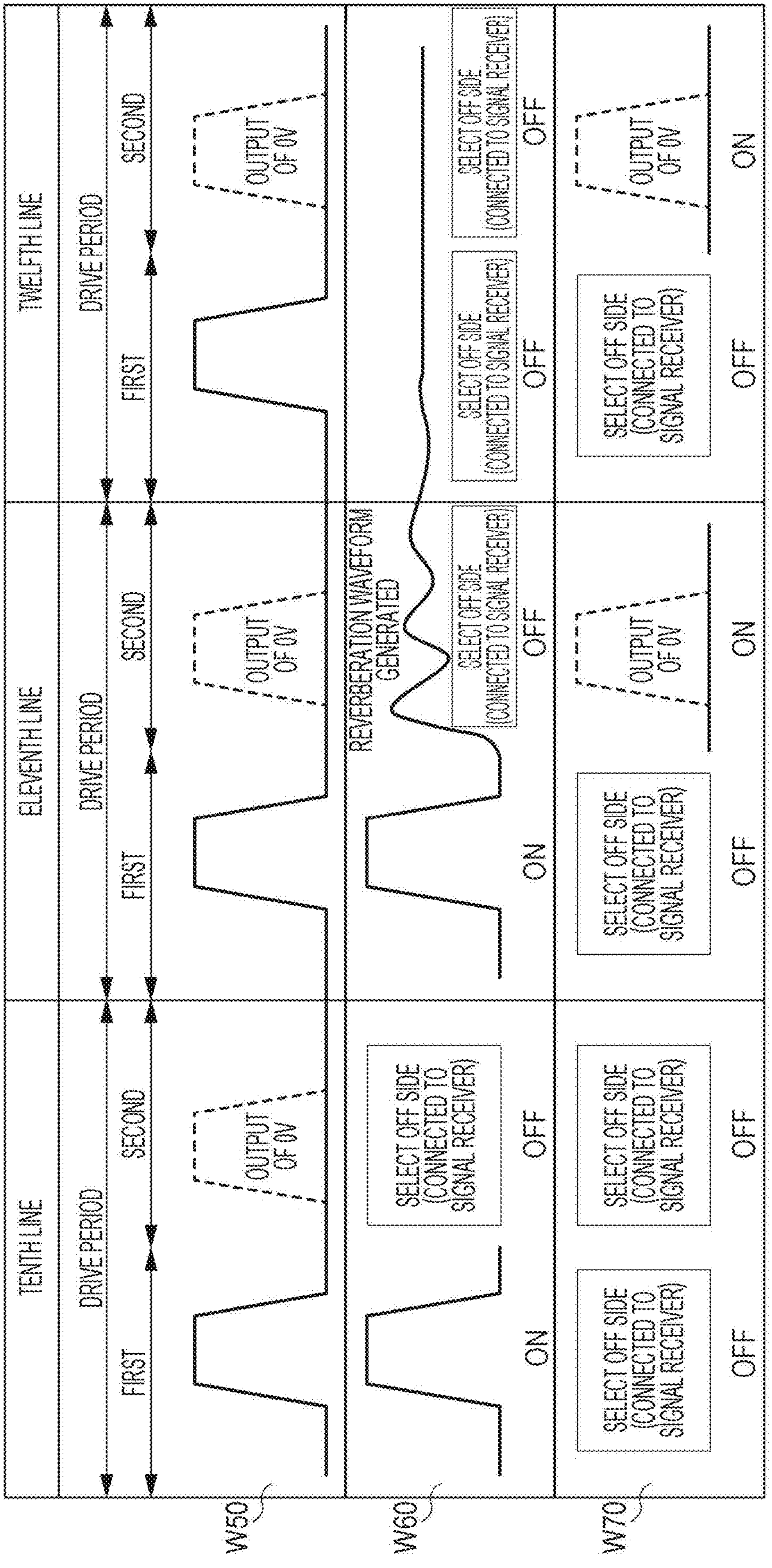
FIG. 17 is a diagram for explaining a signal received by a signal receiver of the nozzle state inspection apparatus according to the first embodiment of the present invention.

Next, a signal received by the signal receiver 23 of the nozzle state inspection apparatus 500 during reverberation waveform measurement will be described. FIG. 17 is a diagram for explaining the signal received by the signal receiver 23 of the nozzle state inspection apparatus 500 according to the present embodiment. FIG. 17 illustrates the drive waveform W50 for the tenth to twelfth lines, a waveform W60 in the measurement target nozzle, and a waveform W70 in each of the nozzles other than the measurement target nozzle in order from the top. The drive waveform W50 is constantly output for each line of the image F5, and therefore, the drive waveform W50 is the same for each of the tenth to twelfth lines.

For the tenth line, the switch connected to the measurement target nozzle is set to ON when the first drive output W51 is input to the switch, and thus the waveform W60 in the measurement target nozzle becomes the drive output W51. When the second drive output W52 is input to the switch, the switch connected to the measurement target nozzle is switched to OFF and connected to the signal receiver 23. Since the tenth line is not the timing of measuring the reverberation waveform of the measurement target nozzle, the signal receiver 23 does not perform signal acquisition processing even when the switch connected to the measurement target nozzle is connected to the signal receiver 23 for the tenth line. On the other hand, for the tenth line, when the first drive output W51 and the second drive output W52 are input to the switches connected to the nozzles other than the measurement target nozzle, the switches connected to the nozzles other than the measurement target nozzle are set to OFF and connected to the signal receiver 23.

For the eleventh line, the switch connected to the measurement target nozzle is set to ON when the first drive output W51 is input to the switch, and thus the waveform W60 in the measurement target nozzle becomes the drive output W51. When the second drive output W52 is input to the switch connected to the measurement target nozzle, the switch connected to the measurement target nozzle is switched to OFF and connected to the signal receiver 23. Since the eleventh line is the timing of measuring the reverberation waveform of the measurement target nozzle, the signal receiver 23 acquires the reverberation waveform of the measurement target nozzle for the eleventh line and outputs the acquired reverberation waveform to the reverberation wave detector 213 of the head controller 21. On the other hand, for the eleventh line, when the first drive output W51 is input to the switches connected to the nozzles other than the measurement target nozzle, the switches connected to the nozzles other than the measurement target nozzle are set to OFF and are connected to the signal receiver 23. When the second drive output W52 is input to the switches connected to the nozzles other than the measurement target nozzle, the switches connected to the nozzles other than the measurement target nozzle are switched to ON, and the waveform W70 in each of the nozzles other than the measurement target nozzle becomes the drive output W52 of 0 V.

For the twelfth line, when the first drive output W51 is input to the switch connected to the measurement target nozzle, the switch connected to the measurement target nozzle is set to OFF and connected to the signal receiver 23. When the second drive output W52 is input to the switch connected to the measurement target nozzle, the switch connected to the measurement target nozzle is maintained in the OFF state and connected to the signal receiver 23. Therefore, for the twelfth line, the signal receiver 23 subsequently acquires the reverberation waveform of the measurement target nozzle, and outputs the acquired reverberation waveform to the reverberation wave detector 213 of the head controller 21. On the other hand, for the twelfth line, when the first drive output W51 is input to the switches connected to the nozzles other than the measurement target nozzle, the switches connected to the nozzles other than the measurement target nozzle are set to OFF and connected to the signal receiver 23. When the second drive output W52 is input to the switches connected to the nozzles other than the measurement target nozzle, the switches connected to the nozzles other than the measurement target nozzle are switched to ON, and the waveform W70 in each of the nozzles other than the measurement target nozzle becomes the drive output W52 of 0 V.

As described above, in the nozzle state inspection apparatus 500, when the reverberation waveform of the measurement target nozzle is to be measured, that is, when the second drive output W52 is input to the switches connected to the nozzles other than the measurement target nozzle, the switches connected to the nozzles other than the measurement target nozzle are set to ON for the eleventh line illustrated in FIG. 17. Since the nozzles other than the measurement target nozzle are not connected in parallel, the attenuation of the reverberation waveform of the measurement target nozzle due to a large capacity formed by the parallel connection of the nozzles does not occur. Furthermore, although each of the switches connected to the nozzles other than the measurement target nozzle is set to ON during the measurement of the reverberation waveform of the measurement target nozzle, the nozzles other than the measurement target nozzle are not driven and crosstalk does not occur because the drive waveform applied to each of the nozzles other than the measurement target nozzle is the drive output W52 of 0 V.

[Procedure of Nozzle State Inspection Process]

Figure 18:
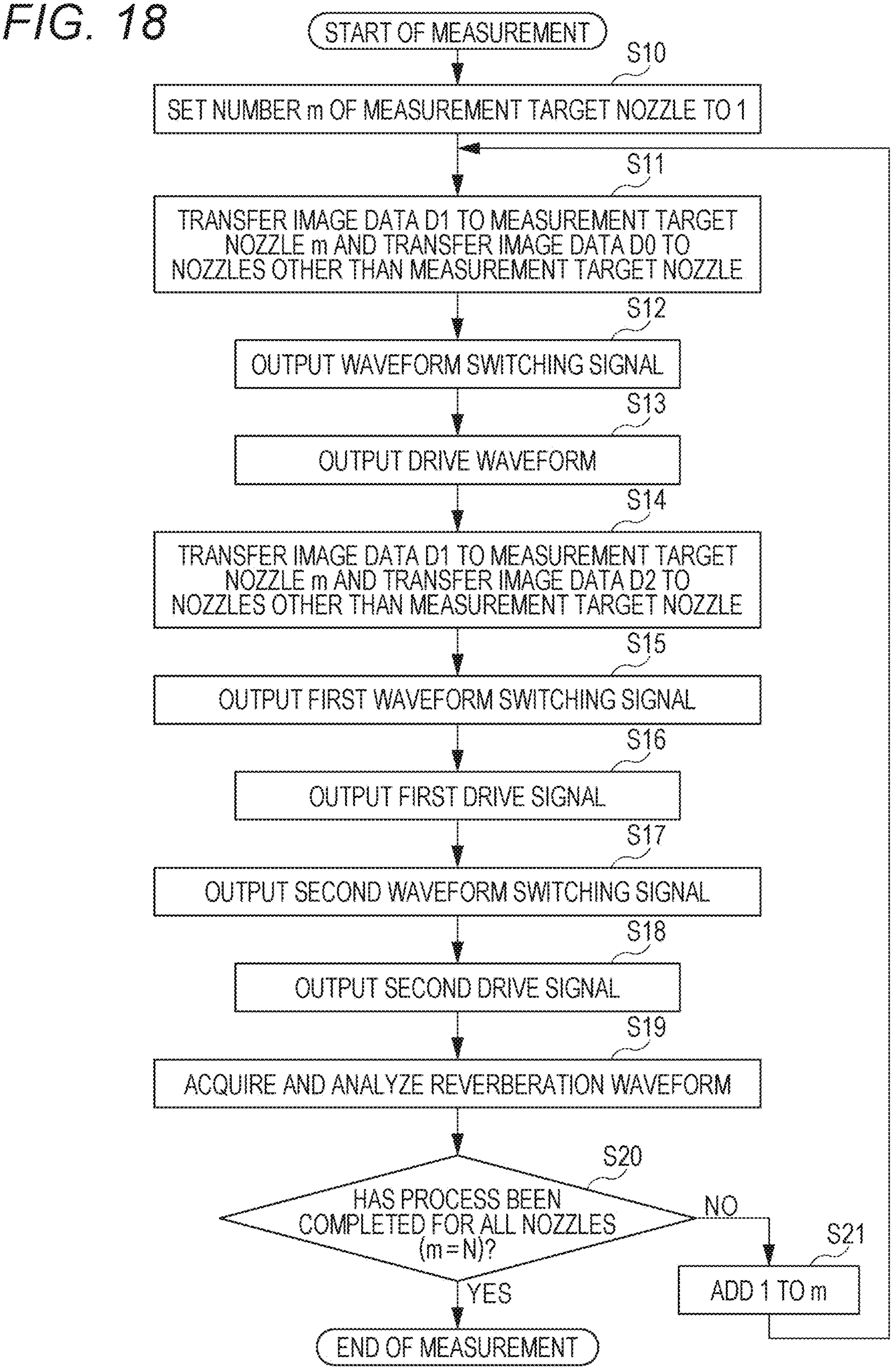
FIG. 18 is a flowchart illustrating a procedure of a nozzle state inspection process in an inspector of the nozzle state inspection apparatus according to the first embodiment of the present invention.

Next, a procedure of the nozzle state inspection process in the inspector of the nozzle state inspection apparatus 500 will be described. FIG. 18 is a flowchart illustrating the procedure of the nozzle state inspection process in the inspector of the nozzle state inspection apparatus 500 according to the present embodiment. In the present embodiment, the inspector inspects (analyzes), in order, the plurality of nozzles for abnormality by acquiring a reverberation waveform from the plurality of nozzles (for example, N nozzles) included in the inkjet head 30 as measurement target nozzles. Note that the present invention is not limited to this embodiment, and for example, some of the nozzles 1 to N may be set as measurement target nozzles and may be inspected one by one. The process described below is started when an inkjet recording apparatus in which the nozzle state inspection apparatus 500 is installed is started in a nozzle inspection mode.

First, the inspector sets a number m of a measurement target nozzle to 1 (step S10).

Next, the data outputter 211 of the inspector transfers the image data D1 to the measurement target nozzle m and transfers the image data D0 to the nozzles other than the measurement target nozzle (step S11). In this processing, the data outputter 211 outputs the image data D1 for the measurement target nozzle m (see FIG. 11) and the image data D0 for the nozzles other than the measurement target nozzle (see FIG. 11) to the switch controller 31 of the inkjet head 30. Next, the switch controller 31 outputs the image data D1 to the switch 32-*m* connected to the measurement target nozzle m, and outputs the image data D0 to the switches connected to the nozzles other than the measurement target nozzle.

Next, the data outputter 211 outputs the waveform switching signal P50 (see FIG. 13) to the switch controller 31 of the inkjet head 30 (step S12).

Next, the drive wave former 212 of the inspector forms the drive waveform W50 (see FIG. 13) and outputs the drive waveform W50 to the drive circuit 22 (step S13). The drive circuit 22 applies the drive waveform W50 to the ON side of the drive IC 32 of the inkjet head 30, that is, to the ON side of each of the switches connected to the nozzles. Next, the switch controller 31 of the inkjet head 30 controls the ON/OFF operation of the switch 32-*m* connected to the measurement target nozzle m in accordance with the waveform switching signal P50 and the image data D1 (see the lines "0" to "10" illustrated in FIG. 14). In addition, the switch controller 31 sets the switches connected to the nozzles other than the measurement target nozzle to OFF in accordance with the image data D0. The processing from step S11 to step S13 is executed up to a predetermined number of lines (for example, up to the line "10" illustrated in FIG. 14). The predetermined number of lines is not limited to "10", but may be any number of lines as long as the number of lines stabilizes the ejection operation of the measurement target nozzle m.

Next, the data outputter 211 transfers the image data D1 to the measurement target nozzle m and transfers the image data D2 to the nozzles other than the measurement target nozzle (step S14). In this case, the data outputter 211 outputs the image data D1 (see FIG. 11) for the measurement target nozzle m and the image data D2 (see FIG. 11) for the nozzles other than the measurement target nozzle to the switch controller 31 of the inkjet head 30. Then, the switch controller 31 outputs the image data D1 to the switch 32-*m* connected to the measurement target nozzle m, and outputs the image data D2 to the switches connected to the nozzles other than the measurement target nozzle.

Next, the data outputter 211 outputs the first waveform switching signal P51 (see FIG. 13) to the switch controller 31 of the inkjet head 30 (step S15).

Next, the drive wave former 212 of the inspector outputs the first drive signal, that is, the drive output W51 (see FIG. 12) (step S16). In this case, the drive circuit 22 applies the first drive output W51 outputted from the drive wave former 212 to the ON side of the drive IC 32 of the inkjet head 30. Then, the switch controller 31 sets the switch 32-*m* connected to the measurement target nozzle m to ON in accordance with the first waveform switching signal P51 and the image data D1. In addition, the switch controller 31 sets the switches connected to the nozzles other than the measurement target nozzle to OFF.

Next, the data outputter 211 outputs the second waveform switching signal P52 (see FIG. 13) to the switch controller 31 of the inkjet head 30 (step S17).

Next, the drive wave former 212 of the inspector outputs the second drive signal, that is, the drive output W52 (see FIG. 12) (step S18). In this case, the drive circuit 22 applies the second drive output W52 outputted from the drive wave former 212 to the ON side of the drive IC 32 of the inkjet head 30. Then, the switch controller 31 switches the switch 32-*m* connected to the measurement target nozzle from ON to OFF in accordance with the second waveform switching signal P52 (see FIG. 15). In addition, the switch controller 31 switches the switches connected to the nozzles other than the measurement target nozzle from OFF to ON in accordance with the second waveform switching signal P52 and the image data D2 (see FIG. 15).

Next, the signal receiver 23 of the inspector acquires a reverberation waveform from the connected measurement target nozzle m and outputs the acquired reverberation waveform to the reverberation wave detector 213 of the inspector (step S19). In this case, the reverberation wave detector 213 performs various kinds of analysis regarding the state of the nozzle on the reverberation waveform of the measurement target nozzle m input from the signal receiver 23, that is, inspects the measurement target nozzle for abnormality.

Next, the inspector determines whether or not the process has been completed for all the nozzles (step S20). In this case, in a case where the number m of the measurement target nozzle is the number "N" of all the nozzles, the head controller 21 determines that the process has been completed for all the nozzles, and the determination result in step S20 is YES. In a case where the number m of the measurement target nozzle is not the number "N" of all the nozzles, the head controller 21 determines that the process has not been completed for all the nozzles, and the determination result in step S20 is NO.

In a case where the head controller 21 determines that the process has not been completed for all the nozzles in step S20 (NO in step S20), the head controller 21 adds "1" to the number m of the measurement target nozzle (step S21).

Next, the head controller 21 returns the process to the processing in step S11 and repeats the processing in steps S11 to S20.

On the other hand, in a case where the head controller 21 determines that the process has been completed for all the nozzles in step S20 (YES in step S20), the nozzle state inspection process ends.

Although the example in which the inspector of the nozzle state inspection apparatus 500 is arranged on the drive board 20 including the FPGA, that is, the example in which the inspector includes the FPGA has been described in the above description, the present invention is not limited thereto. The inspector of the nozzle state inspection apparatus 500 may include, for example, an information processing apparatus illustrated in FIG. 19.

Figure 19:
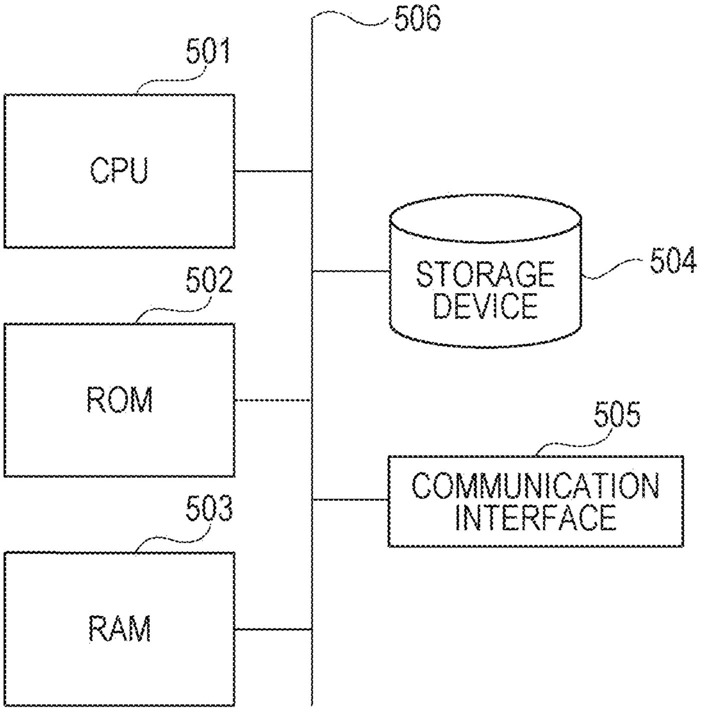
FIG. 19 is a block diagram illustrating an example of a hardware configuration of the inspector of the nozzle state inspection apparatus according to the first embodiment of the present invention.

The information processing apparatus illustrated in FIG. 19 includes a central processing unit (CPU) 501, a read only memory (ROM) 502, a random access memory (RAM) 503, a storage device 504, and a communication interface 505. The CPU 501, the ROM 502, the RAM 503, the storage device 504, and the communication interface 505 are connected to each other via a bus 506 so as to be able to transmit and receive information data to and from each other.

The CPU 501 controls the operation of each component of the inspector. For example, the CPU 501 controls the nozzle state inspection process in the inspector illustrated in FIG. 18. A graphics processing unit (GPU) may be used instead of the CPU 501, or the CPU 501 and the graphics processing unit (GPU) may be used in combination.

The ROM 502 includes, for example, a storage medium such as a nonvolatile memory and stores programs, data and the like to be executed and referenced by the CPU 501.

The RAM 503 includes, for example, a storage medium such as a volatile memory, and temporarily stores information necessary for each processing by the CPU 501.

The storage device 504 includes a non-transitory recording medium storing a computer-readable program to be executed by the CPU 501, and includes, for example, a storage device such as a hard disk drive (HDD). The storage device 504 stores a program for the CPU 501 to control each component, an operating system (OS), a program such as a controller, and data. In addition, the storage device 504 stores the image F5 prepared in advance, a pattern of the waveform switching signal P50, a pattern of the drive waveform W50, and the like. Note that some of the programs and data stored in the storage device 504 may be stored in the ROM 502. Furthermore, the non-transitory recording medium storing the computer-readable program to be executed by the CPU 501 is not limited to the HDD, but may be, for example, a recording medium such as a solid state drive (SSD), a compact disc (CD-ROM), or a digital versatile disc (DVD-ROM).

The communication interface 505 transmits and receives information to and from the inkjet head 30 (see FIG. 2) under control by the CPU 501.

[Effects]

As described above, the nozzle state inspection apparatus 500 according to the present embodiment sets the two-channel switches connected to the nozzles other than the measurement target nozzle to ON and applies the drive waveform (the second drive output W52) of 0 V to the nozzles other than the measurement target nozzle during the measurement of the reverberation waveform of the measurement target nozzle. For this reason, in the nozzle state inspection apparatus 500, a multi-channel switch is not used, and a large capacity is not formed by parallel connection of the nozzles other than the measurement target nozzle. Furthermore, in the nozzle state inspection apparatus 500, although the two-channel switches connected to the nozzles other than the measurement target nozzle are set to ON, no crosstalk occurs because the drive voltage is 0 V. Therefore, according to the nozzle state inspection apparatus 500 according to the present embodiment, it is possible to acquire the reverberation waveform of the nozzle with high accuracy and inspect the nozzle state with an inexpensive configuration.

Second Embodiment

A nozzle state inspection apparatus according to a second embodiment of the present invention will be described below. Since a configuration of the nozzle state inspection apparatus according to the second embodiment is the same as that of the nozzle state inspection apparatus 500 according to the first embodiment, the same reference numerals are used, and the redundant description of the configuration will be omitted.

Different from the first embodiment, in the present embodiment, at the time of printing of an inkjet recording apparatus in which the nozzle state inspection apparatus 500 is installed, the drive wave former 212 of the inspector forms and outputs a plurality of types of patterns of a drive waveform having a plurality of periods by a combination of the first drive output and the second drive output, and controls the sizes of droplets to be ejected from the nozzles. Note that in the present embodiment, when the inkjet recording apparatus in which the nozzle state inspection apparatus 500 is installed operates in a nozzle state inspection mode, a nozzle state inspection process in the nozzle state inspection apparatus 500 is the same as the process described in FIG. 18.

Figure 20:
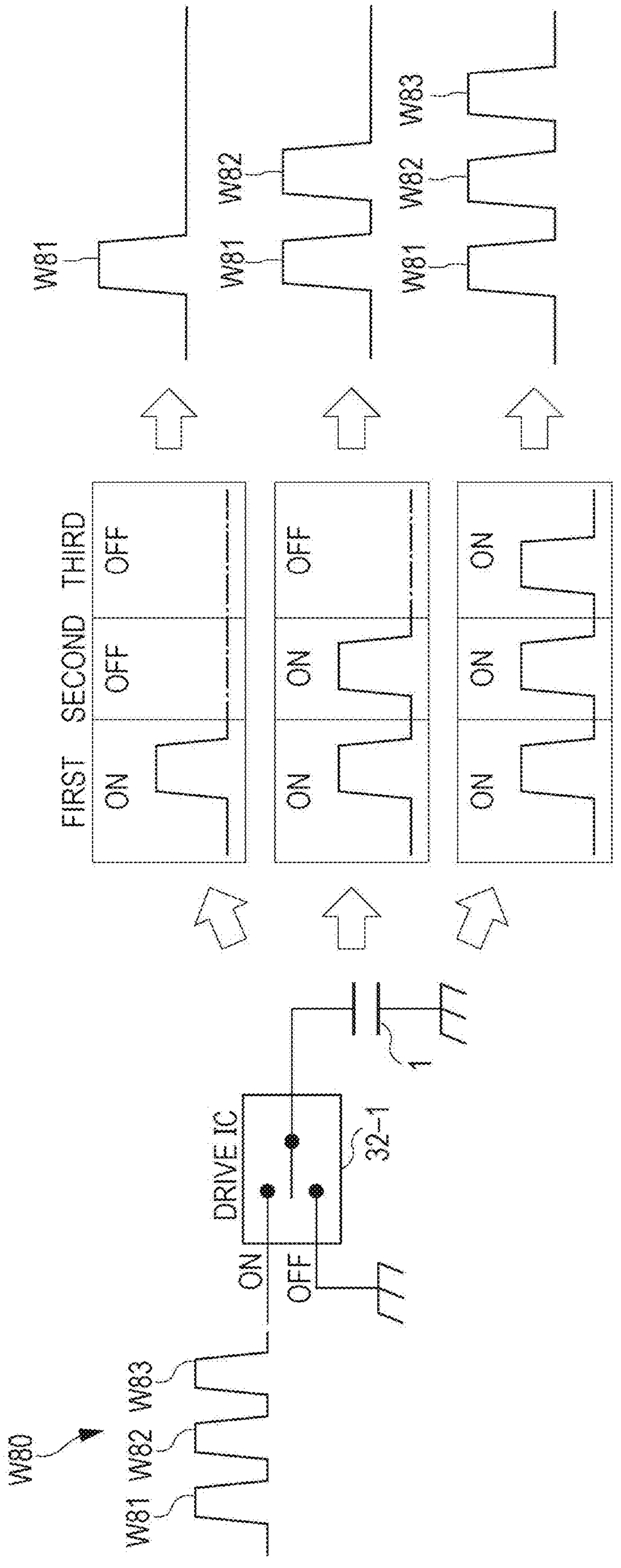
FIG. 20 is a diagram illustrating patterns of a drive waveform used in a nozzle state inspection apparatus according to a second embodiment of the present invention.

FIG. 20 is a diagram illustrating patterns of a drive waveform used in the nozzle state inspection apparatus 500 according to the present embodiment. FIG. 20 illustrates only the nozzle 1 and the switch 32-1 connected to the nozzle 1 for convenience of explanation. The drive waveform W80 that has a plurality of periods and includes first (first-period) drive waveform W81, second (second-period) drive waveform W82, and third (third-period) drive waveform W83 is input to the ON-side input terminal of the switch 32-1.

When the first drive output W81 is input to the switch 32-1, the switch 32-1 is set to ON. When the second drive output W82 and the third drive output W83 are input to the switch 32-1, the switch 32-1 is set to OFF (first pattern), thereby applying only the first drive output W81 to the nozzle 1. Furthermore, the switch 32-1 is set to ON when the first drive output W81 and the second drive output W82 are input to the switch 32-1. The switch 32-1 is set to OFF when the third drive output W83 is input to the switch 32-1 (second pattern), thereby applying the first drive output W81 and the second drive output W82 to the nozzle 1. Furthermore, when the first drive output W81, the second drive output W82, and the third drive output W83 are input to the switch 32-1, the switch 32-1 is set to ON (third pattern), thereby applying the first drive output W81, the second drive output W82, and the third drive output W83 to the nozzle 1.

Figure 21:
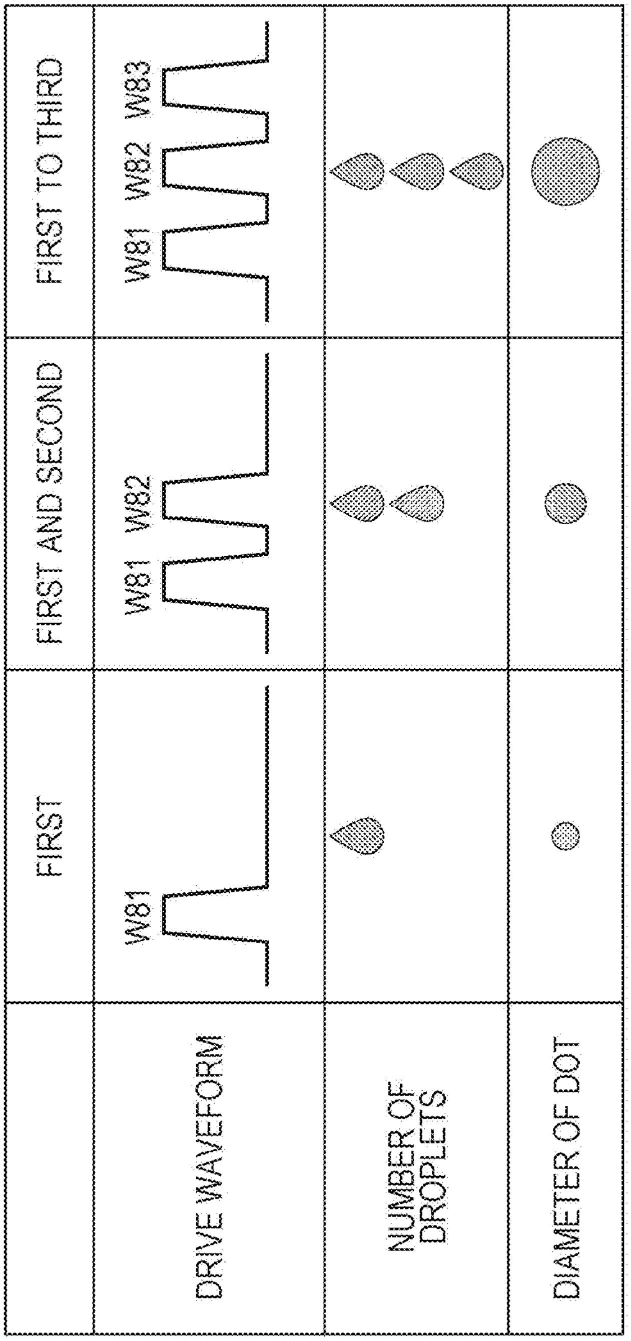
FIG. 21 is a diagram for explaining a correspondence relationship between patterns of a drive waveform and sizes of droplets ejected from a nozzle in the nozzle state inspection apparatus according to the second embodiment of the present invention.

Next, a correspondence relationship between the patterns of the drive waveform and the sizes of droplets ejected from the nozzle will be described. FIG. 21 is a diagram for explaining a correspondence relationship between the patterns of the drive waveform and sizes of droplets ejected from the nozzle in the nozzle state inspection apparatus 500 according to the present embodiment. FIG. 21 illustrates, in order from the top, the drive waveform, the numbers of droplets ejected, and the sizes (diameters) of dots formed in a case where the drive waveform with the first drive output (first pattern) to the drive waveform with the first to three drive output (third pattern) are applied to the nozzle.

As illustrated in FIG. 21, when the first drive output (drive output W81) is applied to the nozzle, the number of droplets ejected from the nozzle is one, and the size of a dot formed is the smallest. When the first and second drive output (the drive output W81 and the drive output W82) are applied to the nozzle, the number of droplets ejected from the nozzle is two and the size of a dot formed is larger than that when the drive waveform having only the first drive output is applied to the nozzle. When the first to third drive output (the drive output W81, the drive output W82, and the drive output W83) are applied to the nozzle, the number of droplets ejected from the nozzle is three, and the size of a dot formed is larger than that when the drive waveform having only the first and second drive output is applied to the nozzle.

In the present embodiment, the example of the operation of controlling the size of a droplet of liquid ejected from the nozzle by using the drive waveform W80 having the three periods in the nozzle state inspection apparatus 500 has been described, but the present invention is not limited thereto. A drive waveform having an arbitrary number of periods may be used in response to a request for a change in the size of a droplet ejected from a nozzle.

[Effects]

As described above, the nozzle state inspection apparatus 500 according to the present embodiment can change the size of a dot to be formed by controlling the number of droplets to be ejected from a nozzle by controlling the number of periods of a drive waveform to be applied when the drive waveform having a plurality of periods is to be applied to the nozzle in a printing mode.

Note that the present invention is not limited to the above-described embodiments, and it goes without saying that various other application examples and modification examples can be adopted without departing from the spirit and scope of the present invention described in the claims.

For example, in each of the above-described embodiments, the configuration of the nozzle state inspection apparatus has been described in detail and specifically in order to explain the present invention in an easily understandable manner, and the present invention is not necessarily limited to one including all of the described configurations. Furthermore, a part of the configuration of any of the embodiments described here can be replaced with the configuration of the other embodiment, and furthermore, a configuration described in a certain embodiment can be added to a configuration described in the other embodiment. Furthermore, another configuration can be added, deleted, or replaced with respect to a part of the configuration described in each embodiment.

In addition, control lines and information lines that are considered to be necessary for description are illustrated, and all of control lines and information lines on a product are not necessarily illustrated. Actually, it may be considered that almost all of the components are connected to each other.

Although embodiments of the present invention have been described and illustrated in detail, the disclosed embodiments are made for purposes of illustration and example only and not limitation. The scope of the present invention should be interpreted by terms of the appended claims.

What is claimed is:

1. A nozzle state inspection apparatus that inspects states of a plurality of nozzles included in an inkjet head, the nozzle state inspection apparatus comprising a hardware processor, wherein the hardware processor is capable of forming a drive waveform including first drive output and second drive output and outputting the drive waveform to the plurality of nozzles included in the inkjet head, and the hardware processor acquires, in accordance with the drive waveform, a reverberation waveform generated in a nozzle to be measured among the plurality of nozzles and inspects the nozzle for abnormality, wherein the hardware processor detects the reverberation waveform commonly acquired for the plurality of nozzles;

the nozzle state inspection apparatus further comprises a two-channel switch that is connectable to each of the plurality of nozzles and operates to switch between outputting the drive waveform to the nozzles and acquiring the reverberation waveform from the nozzles under control by the hardware processor;

wherein the hardware processor controls the operation of the two-channel switch as control of whether or not to apply the drive waveform to the nozzles in accordance with a type of image data included in a pre-registered image.

2. The nozzle state inspection apparatus according to claim 1, wherein the first drive output corresponds to a voltage that causes the reverberation waveform to be generated in the nozzle, and the second drive output corresponds to a voltage lower than the voltage that causes the reverberation waveform to be generated in the nozzle.

3. The nozzle state inspection apparatus according to claim 1, wherein the image data includes first image data corresponding to the nozzle to be measured, second image data that is image data of a non-printed image portion in the image, and third image data corresponding to a nozzle not to be measured among the plurality of nozzles.

4. The nozzle state inspection apparatus according to claim 3, wherein when the first image data is transferred to the nozzle to be measured and the second image data is transferred to the nozzle not to be measured, the hardware processor controls the operation of the two-channel switch such that the drive waveform can be output to the nozzle to be measured and that the reverberation waveform can be acquired from the nozzle not to be measured.

5. The nozzle state inspection apparatus according to claim 3, wherein when the first image data is transferred to the nozzle to be measured and the third image data is transferred to the nozzle not to be measured, and when the first drive output is to be output, the hardware processor controls the operation of the two-channel switch such that the drive waveform can be output to the nozzle to be measured and that the reverberation waveform can be acquired from the nozzle not to be measured.

6. The nozzle state inspection apparatus according to claim 5, wherein when the first image data is transferred to the nozzle to be measured and the third image data is transferred to the nozzle not to be measured, and when the second drive output is to be output, the hardware processor controls the operation of the two-channel switch such that the reverberation waveform can be acquired from the nozzle to be measured and that the drive waveform can be output to the nozzle not to be measured.

7. The nozzle state inspection apparatus according to claim 1, wherein the hardware processor inspects, in order, the plurality of nozzles included in the inkjet head for abnormality by acquiring reverberation waveforms of the plurality of nozzles included in the inkjet head as nozzles to be measured.

8. The nozzle state inspection apparatus according to claim 1, wherein the hardware processor forms and outputs a plurality of types of patterns of the drive waveform having a plurality of periods by a combination of the first drive output and the second drive output during printing of the inkjet head, and controls sizes of droplets to be ejected from the nozzles.

9. The nozzle state inspection apparatus according to claim 7, wherein the hardware processor controls, in each period of the drive waveform, an operation of the two-channel switch as to whether or not the drive waveform can be output to the nozzles.

10. A nozzle state inspection method for an inkjet head including a plurality of nozzles, the nozzle state inspection method comprising:

forming, by a hardware processor, a drive waveform including first drive output and second drive output and outputting the drive waveform to the plurality of nozzles included in the inkjet head;

acquiring, by the hardware processor, in accordance with the drive waveform, a reverberation waveform generated in a nozzle to be measured among the plurality of nozzles and inspecting the nozzle for abnormality, detecting, by the hardware processor, the reverberation waveform commonly acquired for the plurality of nozzles;

operating, by the hardware processor, a two-channel switch that is connectable to each of the plurality of nozzles to switch between outputting the drive waveform to the nozzles and acquire the reverberation waveform from the nozzles under control by the hardware processor; and controlling, by the hardware processor, the operation of the two-channel switch as control of whether or not to apply the drive waveform to the nozzles in accordance with a type of image data included in a pre-registered image.

11. A non-transitory recording medium storing a computer-readable nozzle state inspection program for an inkjet head including a plurality of nozzles, the nozzle state inspection program causing a computer to execute:

form a drive waveform including first drive output and second drive output and output the drive waveform to the plurality of nozzles included in the inkjet head;

acquire, in accordance with the drive waveform, a reverberation waveform generated in a nozzle to be measured among the plurality of nozzles and inspect the nozzle for abnormality, detect the reverberation waveform commonly acquired for the plurality of nozzles;

operate a two-channel switch that is connectable to each of the plurality of nozzles to switch between outputting the drive waveform to the nozzles and acquire the reverberation waveform from the nozzles under control by the computer; and control the operation of the two-channel switch as control of whether or not to apply the drive waveform to the nozzles in accordance with a type of image data included in a pre-registered image.

* * * * *